(12) United States Patent
Nonaka

(10) Patent No.: US 7,005,912 B2
(45) Date of Patent: Feb. 28, 2006

(54) SIMPLE STEP-UP APPARATUS INCLUDING LEVEL SHIFT CIRCUITS CAPABLE OF LOW BREAKDOWN VOLTAGE

(75) Inventor: Yoshihiro Nonaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/684,441

(22) Filed: Oct. 15, 2003

(65) Prior Publication Data

US 2004/0169548 A1 Sep. 2, 2004

(30) Foreign Application Priority Data

Oct. 16, 2002 (JP) ............................. 2002-301186

(51) Int. Cl.
 *G05F 1/10* (2006.01)
 *G05F 3/02* (2006.01)
(52) U.S. Cl. .................................... 327/536
(58) Field of Classification Search ................ 327/536, 327/589; 363/59–60
 See application file for complete search history.

(56) References Cited

U.S. PATENT DOCUMENTS

| | | | |
|---|---|---|---|
| 6,525,949 B1 * | 2/2003 | Johnson et al. ............... | 363/60 |
| 6,781,440 B1 * | 8/2004 | Huang ......................... | 327/537 |
| 2002/0130704 A1 * | 9/2002 | Myono et al. ............... | 327/536 |
| 2004/0021504 A1 * | 2/2004 | Mihara ........................ | 327/536 |

FOREIGN PATENT DOCUMENTS

JP 8-28965 B2 3/1996

* cited by examiner

*Primary Examiner*—Quan Tra
(74) *Attorney, Agent, or Firm*—Sughrue Mion, PLLC

(57) ABSTRACT

In a step-up apparatus, a first level shift circuit receives a first clock signal to generate two phase-opposite second clock signals, and a second level shift circuit receives the first clock signal to generate two phase-opposite third clock signals. A charge pump circuit steps up a power supply voltage at a power supply voltage terminal using the second clock signals to generate a positive voltage, and a polarity inverting circuit inverts the positive voltage using the third clock signals to generate a negative voltage whose absolute value is the same as the positive voltage. A high level of the second clock signals is not higher than the positive voltage, and a low level of the second clock signals is not lower than a voltage at a ground terminal. A high level of the third clock signals is not higher than the power supply voltage, and a low level of the third clock signals is not lower than the negative voltage.

44 Claims, 30 Drawing Sheets

Fig. 13

| TRANSISTOR | ON GATE VOLTAGE | OFF GATE VOLTAGE |
|---|---|---|
| 702 | $< K \cdot V_{DD} - |V_{DD}|$ | $> K \cdot V_{DD}$ |
| 703 | $> V_{tn}$ | $< -K \cdot V_{DD}$ |
| 704 | $> V_{tn}$ | $< 0V$ |
| 705 | $> V_{tn} - K \cdot V_{DD}$ | $< -K \cdot V_{DD}$ |

$V_{tp}$ : THRESHOLD VOLTAGE OF P-CHANNEL MOS
$(-V_{DD} < V_{tp} < 0V)$ $V_{tn}$ : THRESHOLD VOLTAGE OF N-CHANNEL MOS
$(0 < V_{tn} < V_{DD})$

Fig. 18

| TRANSISTOR | ON GATE VOLTAGE | OFF GATE VOLTAGE |
|---|---|---|
| 702 | $< K \cdot V_{DD} - |V_{tp}|$ | $> K \cdot V_{DD}$ |
| 703 | $< -|V_{tp}|$ | $> 0V$ |
| 704 | $> V_{tn}$ | $< 0V$ |
| 705 | $> V_{tn} - K \cdot V_{DD}$ | $< -K \cdot V_{DD}$ |

$V_{tp}$ : THRESHOLD VOLTAGE OF P-CHANNEL MOS
$(-V_{DD} < V_{tp} < 0V)$ $V_{tn}$ : THRESHOLD VOLTAGE OF N-CHANNEL MOS
$(0 < V_{tn} < V_{DD})$

Fig. 30

| TRANSISTOR | ON GATE VOLTAGE | OFF GATE VOLTAGE |
|---|---|---|
| 311 | $< K \cdot V_{DD} - |V_{tp}|$ | $> V_{DD}$ |
| 322 | $> V_{tn}$ | $< 0V$ |
| 323 | $< V_{DD} - |V_{tp}|$ | $> V_{DD}$ |
| 324 | $< 2 \cdot V_{DD} - |V_{tp}|$ | $> 2 \cdot V_{DD}$ |

$V_{tp}$ : THRESHOLD VOLTAGE OF P-CHANNEL MOS
$(-V_{DD} < V_{tp} < 0V)$ $V_{tn}$ : THRESHOLD VOLTAGE OF N-CHANNEL MOS
$(0 < V_{tn} < V_{DD})$

SIMPLE STEP-UP APPARATUS INCLUDING LEVEL SHIFT CIRCUITS CAPABLE OF LOW BREAKDOWN VOLTAGE

BACKGROUND OF THE INVENTION

1. Field of the Invention

The present invention relates to a step-up apparatus or a DC-DC converter.

2. Description of the Related Art

Generally, a step-up apparatus is constructed by a charge pump circuit. On the other hand, in a liquid crystal display (LCD) apparatus, a positive voltage and a negative voltage are required to maintain the quality of the liquid crystal.

A first prior art step-up apparatus for generating a positive voltage and a negative voltage is constructed by a first level shift circuit for receiving a first clock signal to generate two second clock signals opposite in phase with each other, a K (K=2, 3, . . . )-multiple charge pump circuit for generating the positive voltage of $K \cdot V_{DD}$ using the second clock signals where $V_{DD}$ is a power supply voltage, a second level shift circuit for receiving the first clock signal to generate two third clock signals opposite in phase with each other, and a (−K)-multiple charge pump circuit for generating the negative voltage of $-K \cdot V_{DD}$ using the third clock signals. This will be explained later in detail.

In the above-described first prior art step-up apparatus, however, since the (−K)-multiple charge pump circuit is complex, the step-up apparatus is high in cost.

A second prior art step-up apparatus for generating a positive voltage and a negative voltage is constructed by a level shift circuit for receiving a clock signal to generate two phase-opposite clock signals, a K(K=2, 3, . . . )-multiple charge circuit for generating the positive voltage of $K \cdot V_{DD}$ using the two phase-opposite clock signals, and a (−1)-multiple charge pump circuit for generating the negative voltage of $-K \cdot V_{DD}$ using the positive voltage and the two phase-opposite clock signals. This also will be explained later in detail.

In the above-described second prior art step-up apparatus, the number of circuit elements is decreased to simplify the apparatus. However, since the transistors within the level shift circuit need to have a much higher breakdown voltage than that of the level shift circuits of the above-described first prior art step-up apparatus, the thickness of gate insulating layers of the transistors, the gate length and/or gate width of the transistors need to be large, which would degrade the integration.

SUMMARY OF THE INVENTION

It is an object of the present invention to provide a step-up apparatus including level shift circuits capable of a low breakdown voltage.

According to the present invention, in a step-up apparatus, a first level shift circuit receives a first clock signal to generate two phase-opposite second clock signals, and a second level shift circuit receives the first clock signal to generate two phase-opposite third clock signals. A charge pump circuit steps up a power supply voltage at a power supply voltage terminal using the second clock signals to generate a positive voltage, and a polarity inverting circuit inverts the positive voltage using the third clock signals to generate a negative voltage whose absolute value is the same as the positive voltage. A high level of the second clock signals is not higher than the positive voltage, and a low level of the second clock signals is not lower than a voltage at a ground terminal. A high level of the third clock signals is not higher than the power supply voltage, and a low level of the third clock signals is not lower than the negative voltage.

Also, in a step-up apparatus, a first level shift circuit receives a first clock signal to generate two phase-opposite second clock signals, and a second level shift circuit receives the first clock signal to generate a third clock signal. A charge pump circuit steps up a power supply voltage at a power supply voltage terminal using the second clock signals to generate a positive voltage. A polarity inverting circuit inverts the positive voltage using the third clock signal to generate a negative voltage whose absolute value is the same as the positive voltage. A high level of the second clock signals is not higher than the positive voltage, and a low level of the second clock signals is not lower than a voltage at a ground terminal. A high level of the third clock signal is not higher than the voltage at the ground voltage, and a low level of the third clock signal is not lower than the negative voltage.

Further in a step-up apparatus, a level shift circuit receives a first clock signal to generate a 2nd clock signal, a 3rd clock signal, . . . , a K-th clock signal (K=2, 3, . . . ) having a definite voltage swing. A charge pump circuit steps up a power supply voltage at a power supply voltage terminal using said first, second, . . . , K-th clock signals to generate a positive voltage.

BRIEF DESCRIPTION OF THE DRAWINGS

The present invention will be more clearly understood from the description set forth below, ad compared with the prior art, with reference to the accompanying drawings, wherein:

FIG. 13 is a table for explaining the ON gate voltages and OFF gate voltages of the transistors of FIGS. 12A and 12B;

FIG. 18 is a table for explaining the ON gate voltages and OFF gate voltages of the transistors of FIG. 17;

FIG. 30 is a table for explaining the ON gate voltages and OFF gate voltages of the transistors of FIG. 29.

DESCRIPTION OF THE PREFERRED EMBODIMENTS

Before the description of the preferred embodiments, prior art step-up apparatuses will be explained with reference to FIGS. 1, 2A, 2B, 2C, 2D, 2E, 3, 4, 5, 6, 7, 8A, 8B, 8C, 9 and 10.

Figure 1:
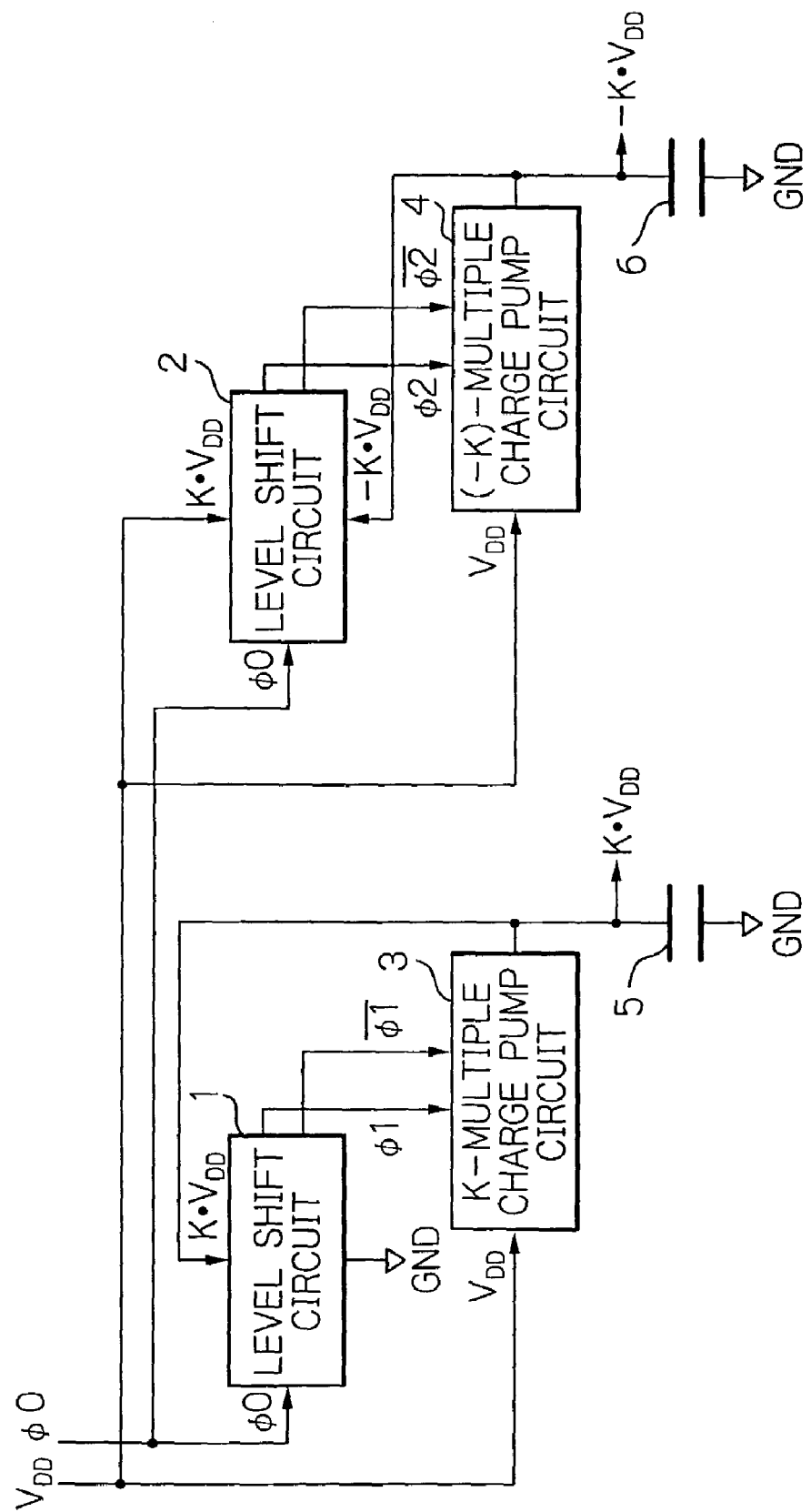
FIG. 1 is a block circuit diagram illustrating a first prior art step-up apparatus.
Figure 2A:
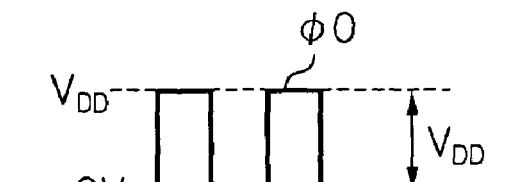
FIGS. 2A, 2B, 2C, 2D and 2E are timing diagrams showing the clock signals of the step-up apparatus of FIG. 1.
Figure 2B:
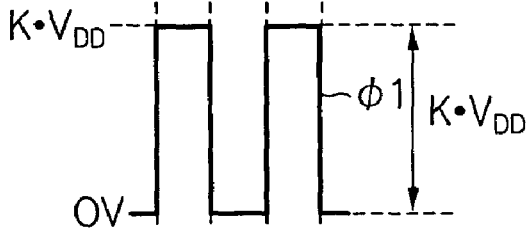
Figure 2C:
Figure 2D:
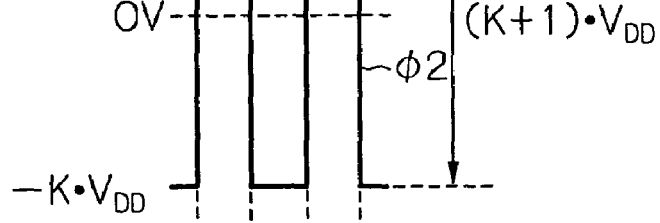
Figure 2E:
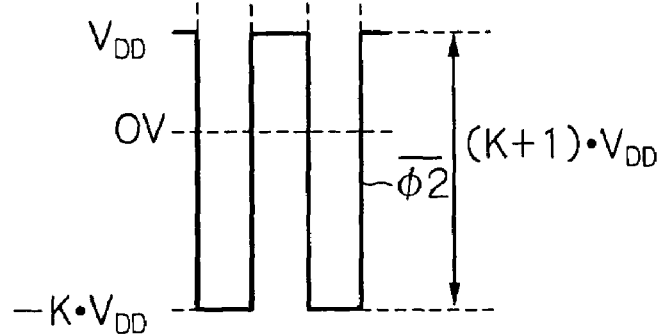

In FIG. 1, which illustrates a first prior art step-up apparatus for generating a positive voltage of $K \cdot V_{DD}$ (K=2, 3, ...) and a negative voltage of $-K \cdot V_{DD}$, a level shift circuit 1 is powered by the ground voltage GND and the positive voltage $K \cdot V_{DD}$ to level-shift a clock signal $\phi 0$ having a voltage swing $V_{DD}$ as shown in FIG. 2A, and thus generates clock signals $\phi 1$ and $\overline{\phi 1}$ having a voltage swing $K \cdot V_{DD}$ as shown in FIGS. 2B and 2C. On the other hand, a level shift circuit 2 is powered by the negative voltage $-K \cdot V_{DD}$ and the positive voltage $V_{DD}$ to level-shift the clock signal $\phi 0$ having the voltage swing $V_{DD}$ as shown in FIG. 2A, and thus generates clock signals $\phi 2$ and $\overline{\phi 2}$ having a voltage swing $(K+1) \cdot V_{DD}$ as shown in FIGS. 2D and 2E.

A K-multiple charge pump circuit 3 steps up the positive voltage $V_{DD}$ using the clock signals $\phi 1$ and $\overline{\phi 1}$ to generate the positive voltage $K \cdot V_{DD}$. On the other hand, a (−K)-multiple charge pump circuit 4 steps up the positive voltage $V_{DD}$ using the clock signals $\phi 2$ and $\overline{\phi 2}$ to generate the negative voltage $-K \cdot V_{DD}$.

The voltage $K \cdot V_{DD}$ and $-K \cdot V_{DD}$ are held in capacitors 5 and 6, respectively.

Figure 3:
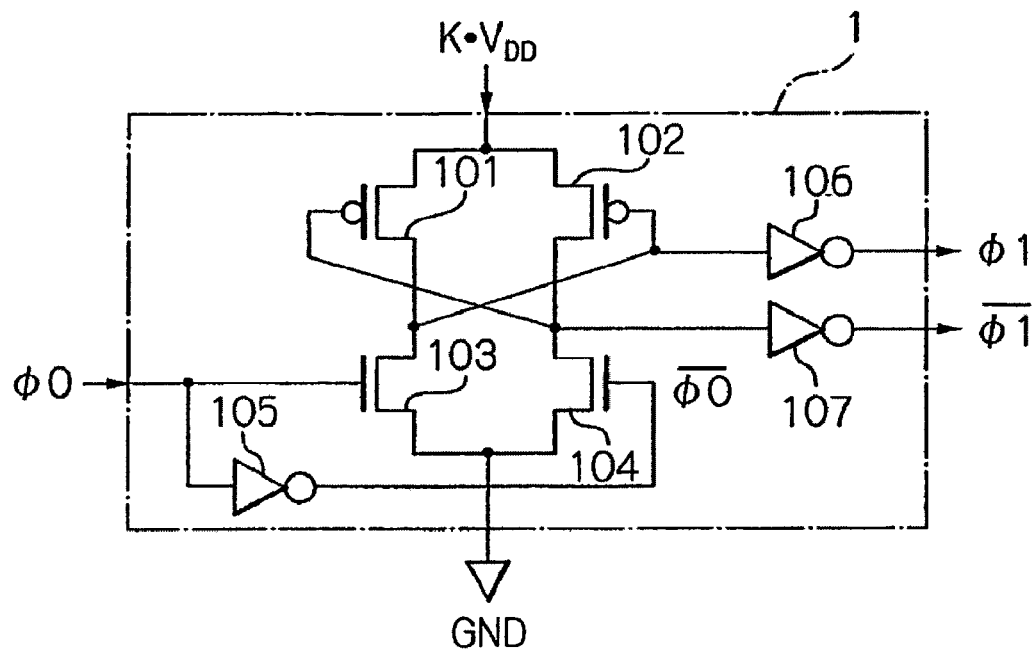
FIG. 3 is a detailed circuit diagram of the level shift circuit of FIG. 1.

In FIG. 3, which is a detailed circuit diagram of the level shift circuit 1 of FIG. 1, a CMOS level shifter formed by cross-coupled load P-channel MOS transistors 101 and 102 and drive N-channel MOS transistors 103 and 104 is powered by the ground voltage GND and the positive voltage $K \cdot V_{DD}$. The gate of the transistor 103 receives the clock signal $\phi 0$ while the gate of the transistor 104 receives an inverted signal of the clock signal $\phi 0$ via a CMOS inverter 105. As a result, the CMOS level shifter generates clock signals $\phi 1$ and $\overline{\phi 1}$ having the voltage swing of $K \cdot V_{DD}$ via CMOS inverters 106 and 107. In this case, the CMOS inverters 105, 106 and 107 are powered by the ground voltage GND and the positive voltage $K \cdot V_{DD}$. Therefore, the transistors within the level shift circuit 1 need to have a breakdown voltage higher than $K \cdot V_{DD}$.

Figure 4:
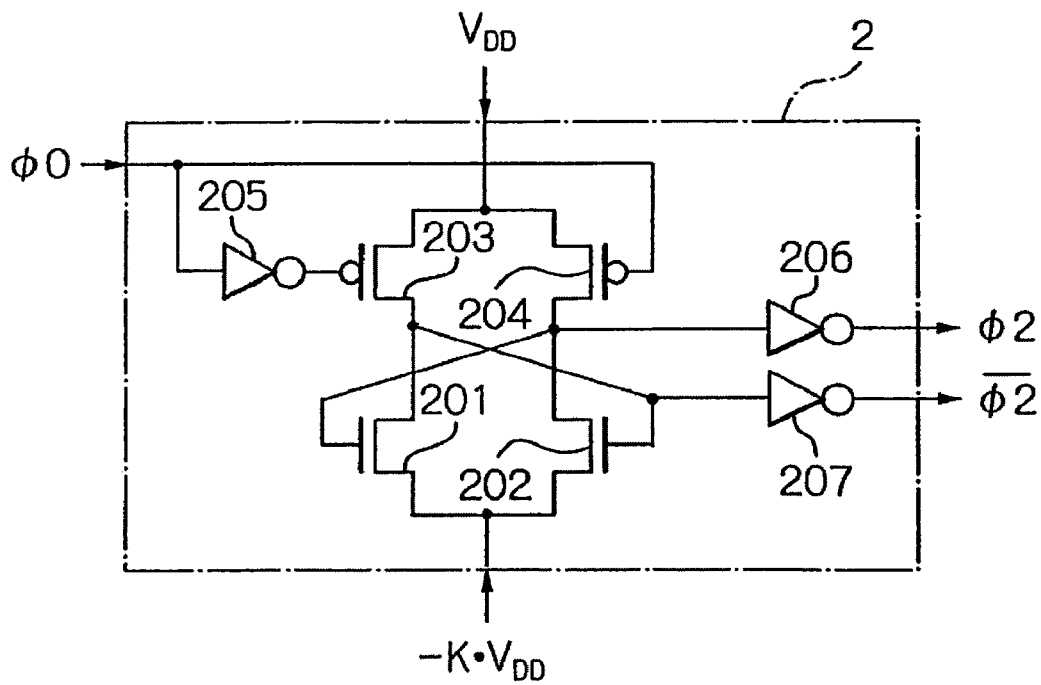
FIG. 4 is a detailed circuit diagram of the level shift circuit of FIG. 1.

In FIG. 4, which is a detailed circuit diagram of the level shift circuit 2 of FIG. 1, a CMOS level shifter formed by cross-coupled load N-channel MOS transistors 201 and 202 and drive P-channel MOS transistors 203 and 204 is powered by the negative voltage $-K \cdot V_{DD}$ and the positive voltage $V_{DD}$. The gate of the transistor 203 receives the inverted signal of the clock signal $\phi 0$ via a CMOS inverter 205 while the gate of the transistor 204 receives the inverted signal $\overline{\phi 0}$. As a result, the CMOS level shifter generates clock signals $\phi 2$ and $\overline{\phi 2}$ having the voltage swing of $(K+1) \cdot V_{DD}$ via CMOS inverters 206 and 207. In this case, the inverters 205, 206 and 207 are powered by the negative voltage $-K \cdot V_{DD}$ and the positive voltage $V_{DD}$. Therefore, the transistors within the level shift circuit 2 need to have a breakdown voltage higher than $(K+1) \cdot V_{DD}$.

Figure 5:
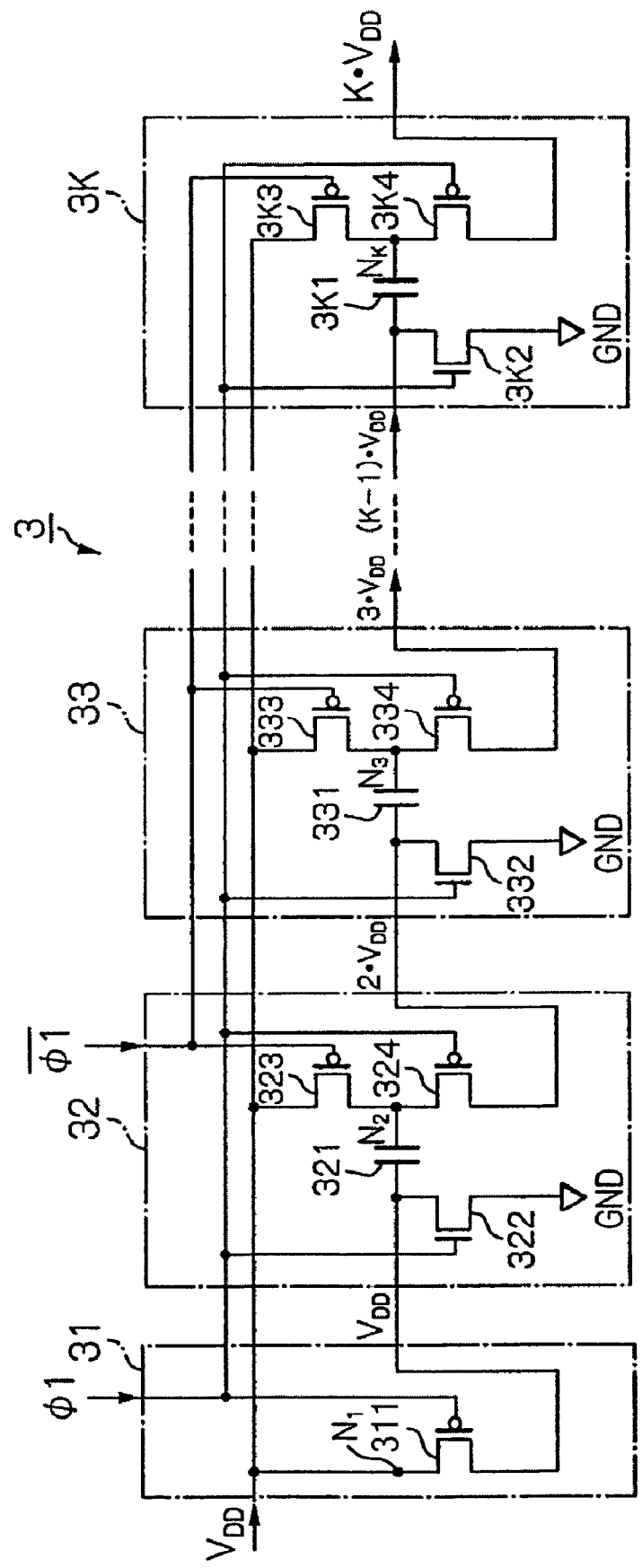
FIG. 5 is a detailed circuit diagram of the K-multiple charge pump circuit of FIG. 1.

In FIG. 5, which is a detailed circuit diagram of the K-multiple charge pump circuit 3 of FIG. 1, the K-multiple charge pump circuit 3 is constructed by circuits 31, 32, 33, ..., 3K. The circuit 31 is formed by a step-up P-channel MOS transistor 311. On the other hand, the circuits 32, 33, ..., 3K have the same configuration. That is, the circuit 3i (i=2, 3, ..., K) is formed by a charging capacitor 3i1, a charging N-channel MOS transistor 3i2, a charging P-channel MOS transistor 3i3 and a step-up P-channel transistor 3i4.

The operation of the K-multiple charge pump circuit 3 is explained next.

First, when the clock signal $\phi 1$ is made high ($=K \cdot V_{DD}$) and the clock signal $\overline{\phi 1}$ is made low (=0V), the charging transistors 322, 323, 332, 333, ..., 3K2 and 3K3 are turned ON, so that the voltages at nodes $N_2, N_3, ..., $ and $N_K$ of the circuits 32, 33, 3K are made $V_{DD}$. Thus, the capacitors 321, 331, ..., 3K1 are positively charged by $V_{DD}$. Note that the voltage at node $N_1$ of the circuit 31 is always $V_{DD}$.

Next, when the clock signal $\phi 1$ is made low (=0V) and the clock signal $\overline{\phi 1}$ is made high ($K \cdot V_{DD}$), the charging transistors 322, 323, 332, 333, ..., 3K2 and 3K3 are turned OFF, while the step-up transistors 311, 324, 334, ..., and 3K4 are turned ON. As a result, the circuit 31 generates a positive voltage of $V_{DD}$. In the circuit 32, $V_{DD}$ is added to the voltage $V_{DD}$ at node $N_2$, so that the voltage at node $N_2$ becomes $2 \cdot V_{DD}$ ($=V_{DD}+V_{DD}$). Thus, the circuit 32 generates a voltage of $2 \cdot V_{DD}$. In the circuit 32, $2 \cdot V_{DD}$ is added to the voltage $V_{DD}$ at node $N_2$, so that the voltage at node $N_2$ becomes $3 \cdot V_{DD}$ ($=V_{DD}+2 \cdot V_{DD}$). Thus, the circuit 32 generates a voltage of $3 \cdot V_{DD}$. In the circuit 3K, $(K-1) \cdot V_{DD}$ is added to the voltage $V_{DD}$ at node $N_2$, so that the voltage at node $N_2$ becomes $K \cdot V_{DD}$ ($=V_{DD}+(K-1) \cdot V_{DD}$). Thus, the circuit 3K generates a voltage of $K \cdot V_{DD}$.

Figure 6:
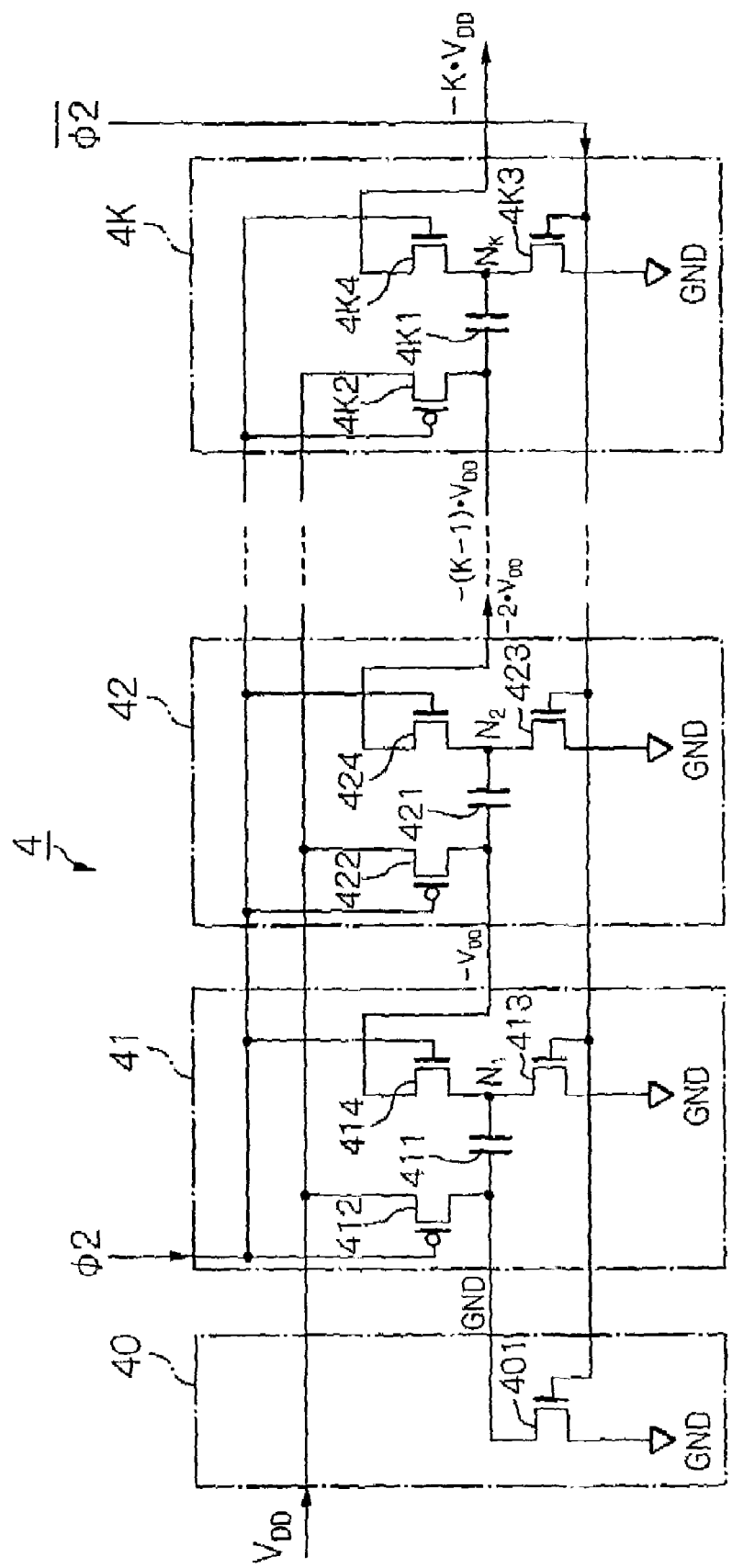
FIG. 6 is a detailed circuit diagram of the (−K)-multiple charge pump circuit of FIG. 1.
Figure 10:
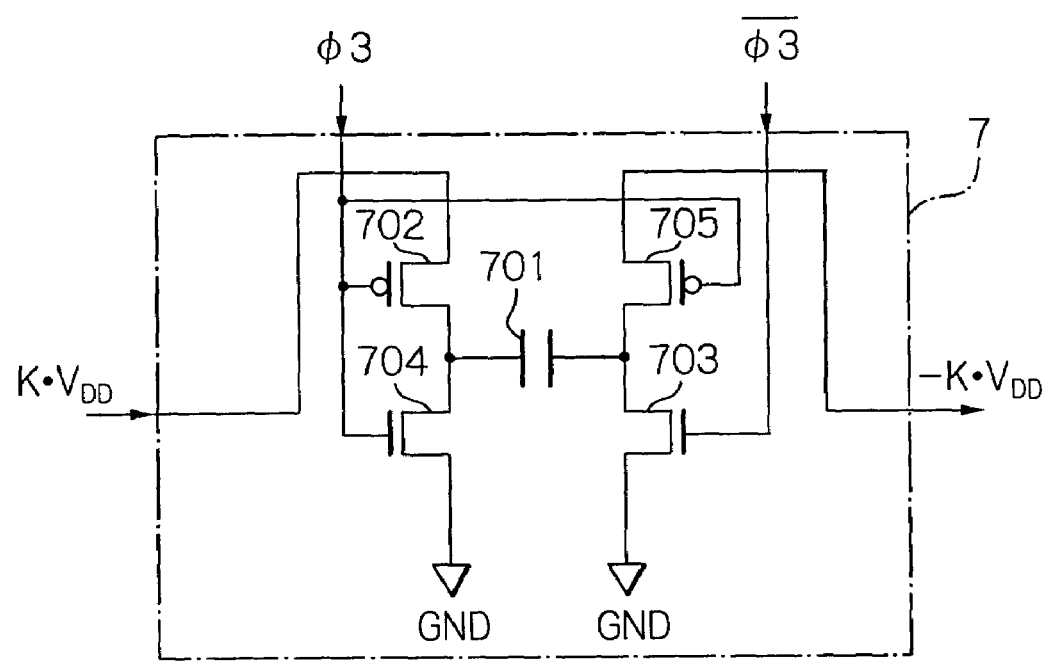
FIG. 10 is a detailed circuit diagram of the (−1)-multiple charge pump circuit of FIG. 7.

In FIG. 6, which is a detailed circuit diagram of the (−K)-multiple charge pump circuit 4 of FIG. 1 (see: FIG. 10 of JP-A-6-165482 where a (−2)-multiple charge pump circuit is disclosed), the (−K)-multiple charge pump circuit 4 is constructed by circuits 40, 41, 42, . . . , 4K. The circuit 40 is formed by a step-up N-channel MOS transistor 401. On the other hand, the circuits 41, 42, . . . , 4K have the same configuration. That is, the circuit 4$i$ (i=1, 2, . . . , K) is formed by a charging capacitor 4$i$1, a charging P-channel MOS transistor 4$i$2, a charging N-channel MOS transistor 4$i$3 and a step-up N-channel transistor 4$i$4.

The operation of the (−K)-multiple charge pump circuit 4 is explained next.

First, when the clock signal $\phi2$ is made low (=−K·$V_{DD}$) and the clock signal $\overline{\phi2}$ is made high (=$V_{DD}$), the charging transistors 412, 413, 422, 423, . . . , 4K2 and 4K3 are turned ON, so that the voltages at nodes $N_1$, $N_2$, . . . , and $N_K$ of the circuit 41, 42, . . . , 4K are made $V_{DD}$. Thus, the capacitors 411, 421, . . . , 4K1 are negatively charged by $V_{DD}$.

Next, when the clock signal $\phi2$ is made low (=−K·$V_{DD}$) and the clock signal $\overline{\phi2}$ is made high (=$V_{DD}$), the charging transistors 412, 413, 422, 423, . . . , 4K2 and 4K3 are turned OFF, while the step-up transistors 401, 414, 424, . . . , and 4K4 are turned ON. As a result, the circuit 40 generates the ground voltage 0V. In the circuit 41, −$V_{DD}$ is added to the voltage 0V at node $N_1$, so that the voltage at node $N_1$ becomes −$V_{DD}$ (=0−$V_{DD}$). Thus, the circuit 41 generates a voltage of −$V_{DD}$. In the circuit 42, (−$V_{DD}$−$V_{DD}$) is added to the voltage 0V at node $N_2$, so that the voltage at node $N_2$ becomes −2·$V_{DD}$ (=0−$V_{DD}$−$V_{DD}$). Thus, the circuit 32 generates a voltage of −2·$V_{DD}$. In the circuit 4K, −(K−1)·$V_{DD}$−$V_{DD}$ is added to the voltage 0V at node $N_2$, so that the voltage at node $N_2$ becomes −K·$V_{DD}$ (=0V−(K−1)·$V_{DD}$−$V_{DD}$). Thus, the circuit 4K generates a voltage of −K·$V_{DD}$.

In the push-up apparatus of FIG. 1, however, since the (−K)-multiple charge pump circuit 4 is complex, the step-up apparatus of FIG. 1 is high in cost.

Figure 7:
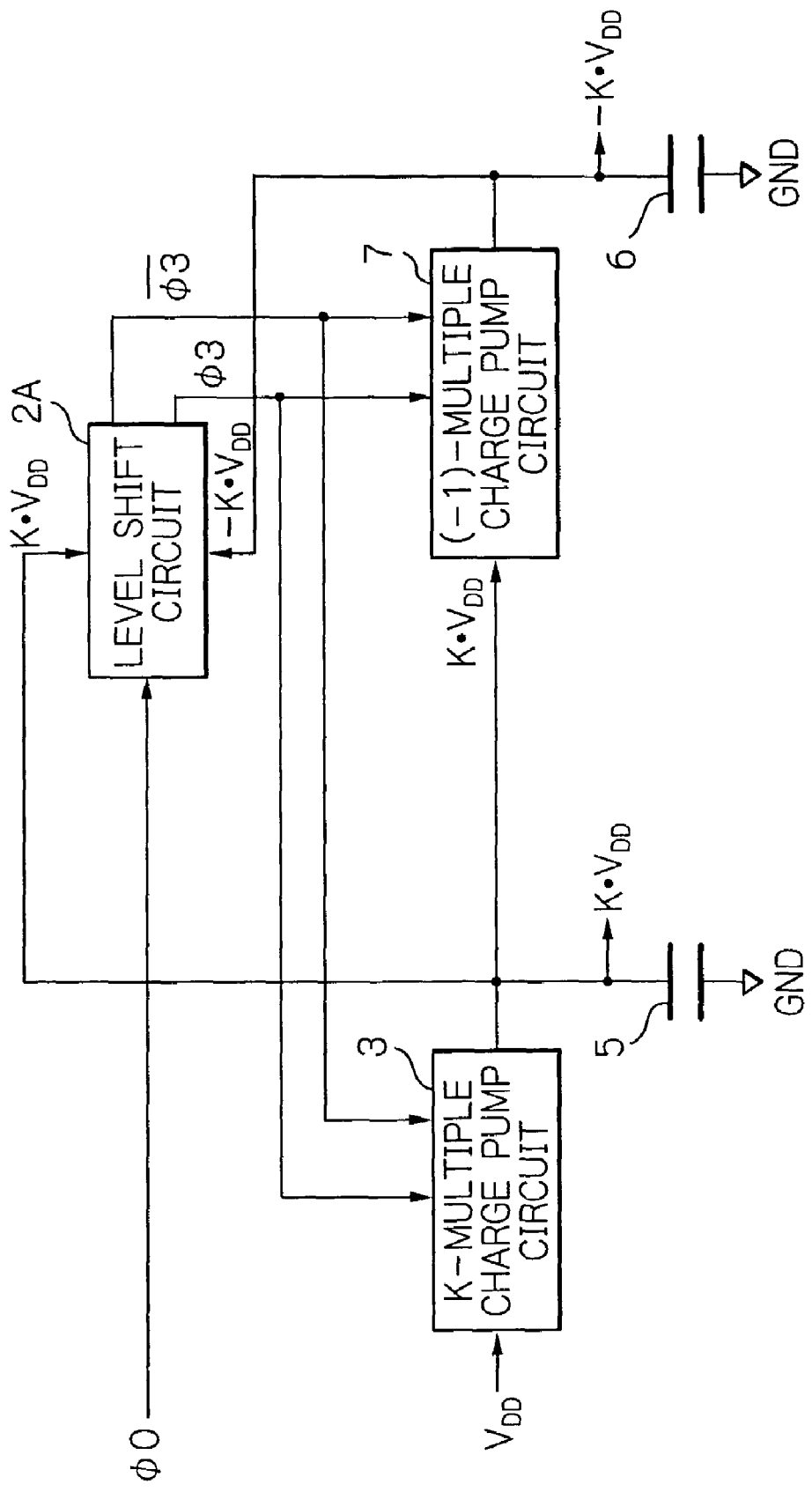
FIG. 7 is a block circuit diagram illustrating a second prior art step-up apparatus.

In FIG. 7, which illustrates a second prior art step-up apparatus, the level shift circuit 1 of FIG. 1 is deleted, and the level shift circuit 2 of FIG. 1 is modified to a level shift circuit 2A. Also, a (−1)-multiple charge pump circuit (or a polarity inverting circuit) 7 is provided instead of the (−K)-multiple charge pump circuit 4 of FIG. 1 (see: FIG. 13 of JP-A-6-165482 where K=2).

Figure 8A:
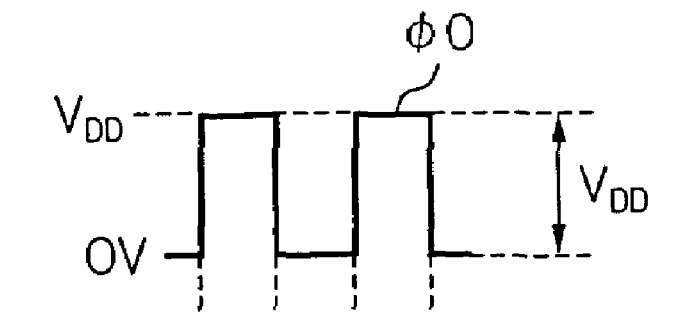
FIGS. 8A, 8B and 8C are timing diagrams showing the clock signals of the step-up apparatus of FIG. 7.
Figure 8B:
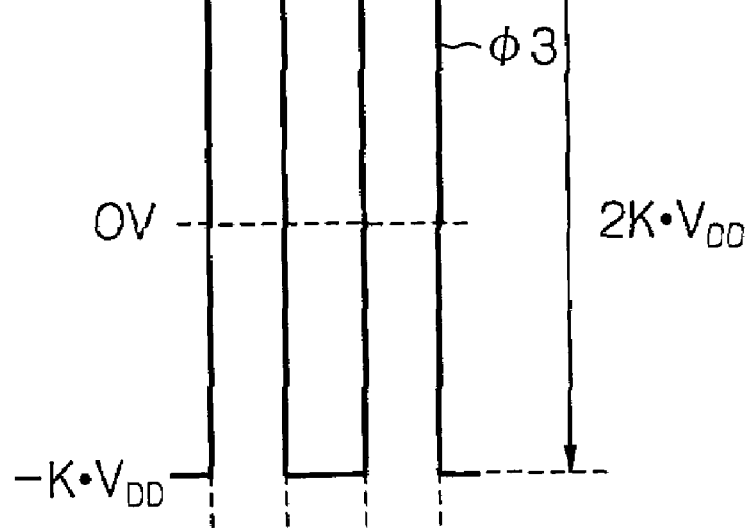
Figure 8C:
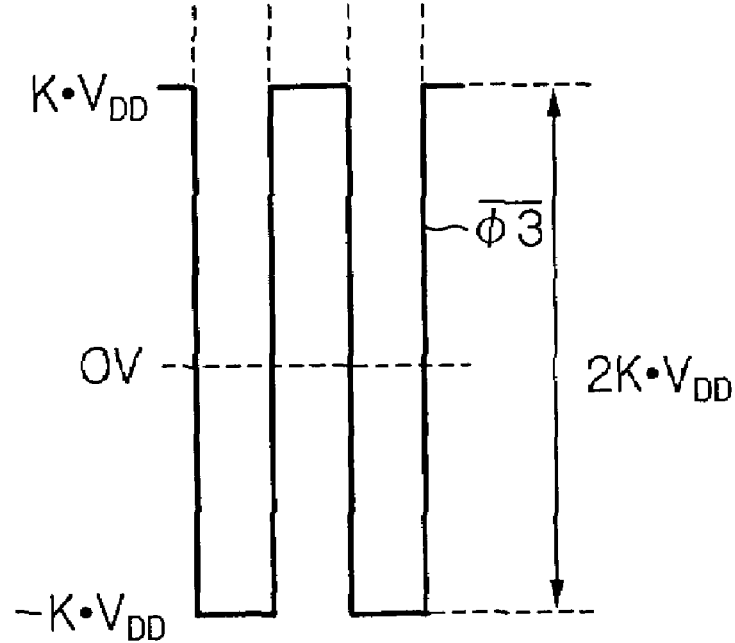

The level shift circuit 2A is powered by a negative voltage −K·$V_{DD}$ and a positive voltage K−K$_{DD}$ to level-shift a clock signal $\phi0$ having a voltage swing $V_{DD}$ as shown in FIG. 8A to generate clock signals $\phi3$ and $\overline{\phi3}$ having a voltage swing 2K·$V_{DD}$ as shown in FIGS. 8B and 8C.

Figure 9:
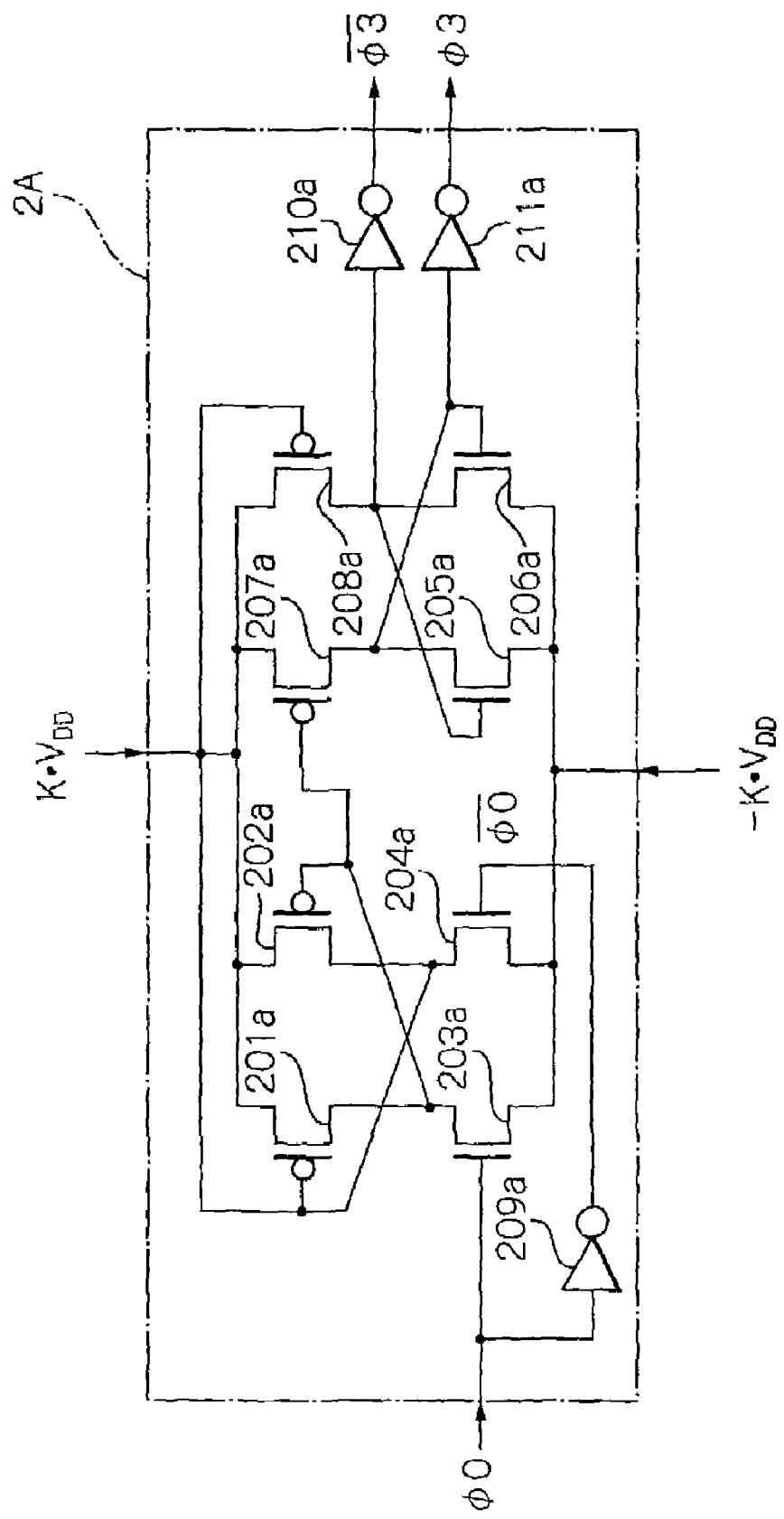
FIG. 9 is a detailed circuit diagram of the level shift circuit of FIG. 7.

In FIG. 9, which is a detailed circuit diagram of the level shift circuit 2A of FIG. 7, a first CMOS level shifter formed by cross-coupled load P-channel MOS transistors 201$a$ and 202$a$ and N-channel drive MOS transistors 203$a$ and 204$a$ is powered by the negative voltage −K·$V_{DD}$ and the positive voltage K·$V_{DD}$, and also, a second CMOS level shifter formed by cross-coupled load N-channel MOS transistors 205$a$ and 206$a$ and drive P-channel drive MOS transistors 207$a$ and 208$a$ is powered by the negative voltage −K·$V_{DD}$, and the positive voltage K·$V_{DD}$. The gate of the transistor 203$a$ receives the clock signal $\phi0$ while the gate of the transistor 204$a$ receives an inverted signal of the clock signal $\phi0$ via a CMOS inverter 209$a$. Also, the gate of the transistor 207$a$ receives a voltage at the drain of the transistor 201$a$ while the gate of the transistor 208$a$ receives a voltage at the drain of the transistor 202$a$. As a result, the second CMOS level shifter generates clock signals $\phi3$ and $\overline{\phi3}$ having a voltage swing 2K·$V_{DD}$ via CMOS inverters 210$a$ and 211$a$. In this case, the inverters 209$a$, 210$a$ and 211$a$ are powered by the negative voltage −K·$V_{DD}$ and the positive voltage K·$V_{DD}$. Therefore, in the transistors within the level shift circuit 2A need to have a breakdown voltage higher than 2K·$V_{DD}$.

In FIG. 10, which is a detailed circuit diagram of the (−1)-multiple charge pump circuit 7 of FIG. 7, the (−1)-multiple charge pump circuit 7 is constructed by a charging capacitor 701, a charging P-channel MOS transistor 702, a charging N-channel MOS transistor 703, a step-up N-channel MOS transistor 704 and a step-up N-channel MOS transistor 705.

The operation of the (−1)-multiple charge pump circuit 7 of FIG. 10 is explained next.

First, when the clock signal $\phi3$ is made low (=−K·$V_{DD}$) and the clock signal $\overline{\phi3}$ is made high (=K·$V_{DD}$), the transistors 702 and 703 are turned ON, so that the capacitor 701 is charged by 2·$V_{DD}$.

Next, when the clock signal $\phi3$ is made high (=K·$V_{DD}$) and the clock signal $\overline{\phi3}$ is made low (−K·$V_{DD}$), the charging transistors 702 and 703 are turned OFF, while the step-up transistors 704 and 705 are turned ON. As a result, the (−1)-multiple charge pump circuit 7 generates the voltage −K·$V_{DD}$ which is stored in the capacitor 6 of FIG. 7.

In the step-up apparatus of FIG. 7, although the number of circuit elements is decreased to simplify the apparatus, the transistors within the level shift circuit 2A need to have a breakdown voltage higher than 2K·$V_{DD}$, which increases the thickness of gate insulating layers, the gate length and/or width of gate electrodes of the transistors, thus degrading the integration of the apparatus.

Figure 11:
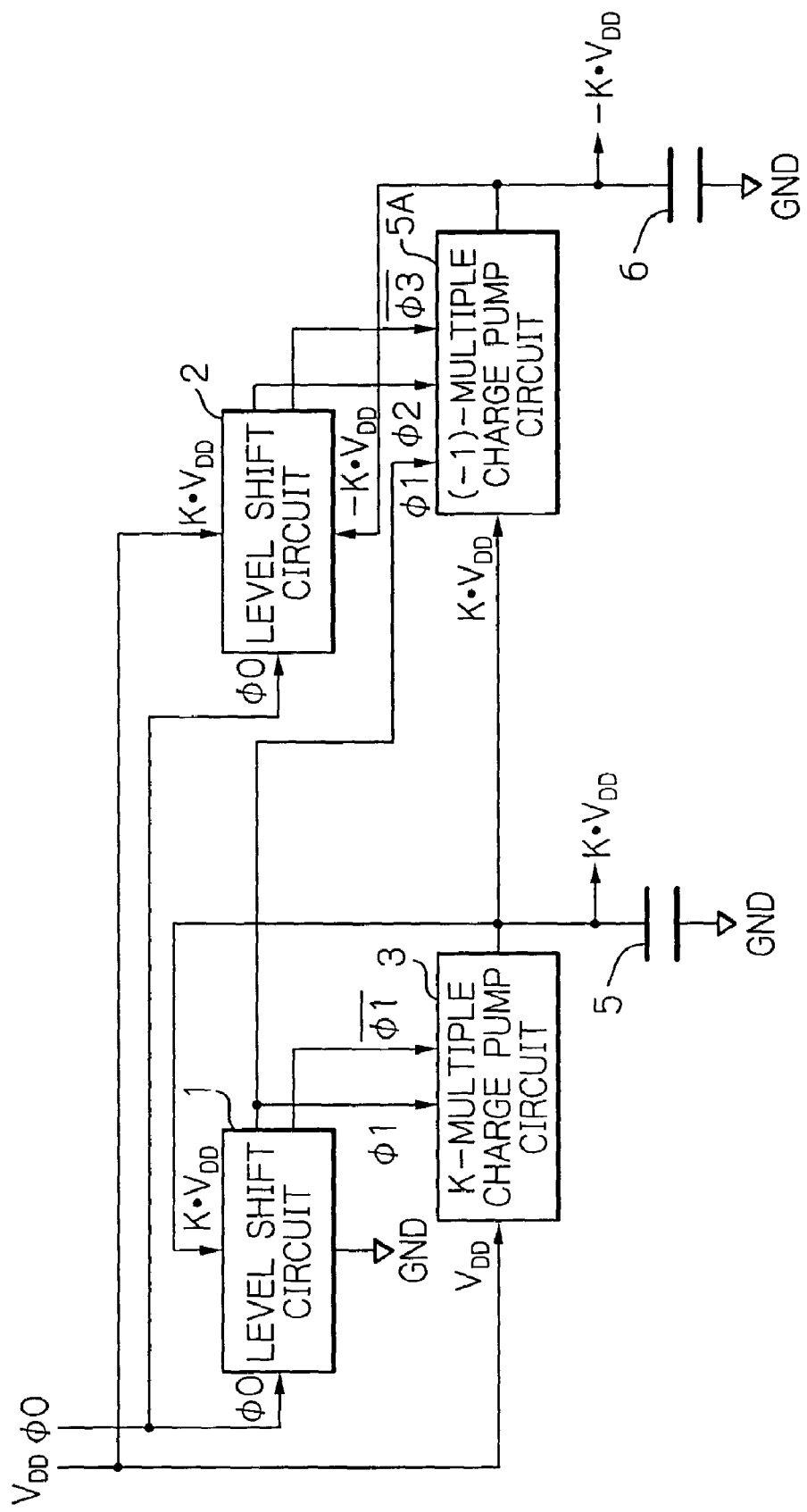
FIG. 11 is a block circuit diagram illustrating a first embodiment of the step-up apparatus according to the present invention.

In FIG. 11, which illustrates a first embodiment of the step-up apparatus according to the present invention, the (−K)-multiple charge pump circuit 4 of FIG. 1 is replaced by a (−1)-multiple charge pump circuit (or a polarity inverting circuit) 7A which receives the positive voltage K·$V_{DD}$ from the K-multiple charge pump circuit 3 to generate a negative voltage −K·$V_{DD}$ using the clock signals $\phi1$, $\phi2$ and $\overline{\phi2}$.

Figure 12A:
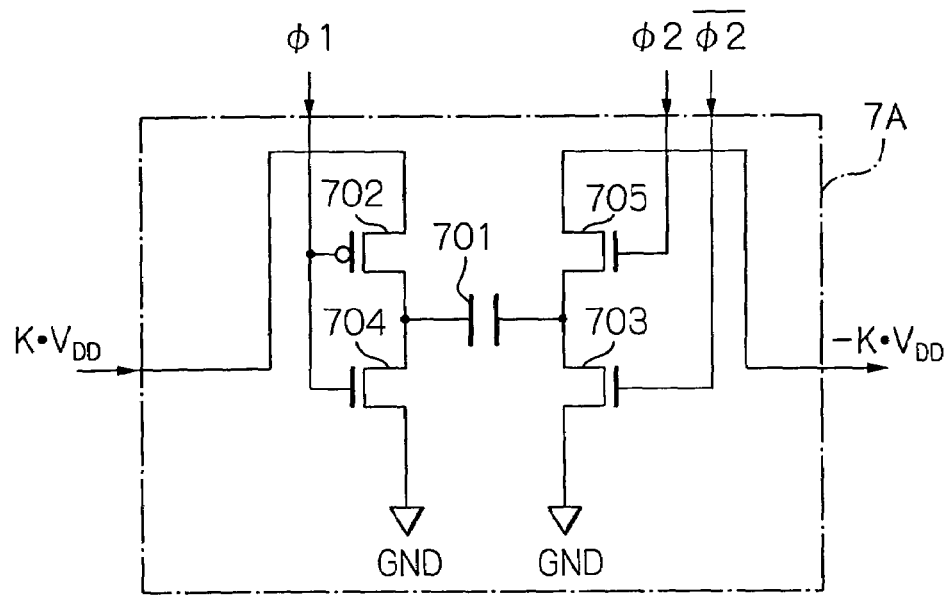
FIGS. 12A and 12B are detail circuit diagrams of the (−1)-multiple charge pump circuit of FIG. 11.
Figure 12B:
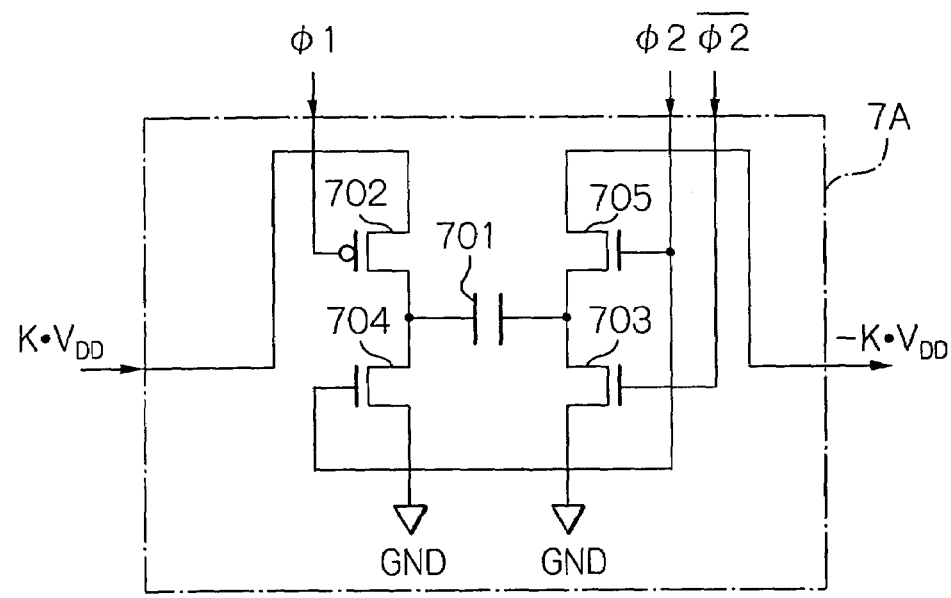

The (−1)-multiple charge pump circuit 7A is illustrated in detail in FIGS. 12A and 12B which correspond to FIG. 10.

In FIG. 12A, the gates of the transistors 702 and 704 receive the clock signal $\phi1$. On the other hand, the gate of the transistor 705 receives the clock signal $\phi2$ while the gate of the transistor 703 receives the clock signal $\overline{\phi2}$. That is, as shown in FIG. 13, the transistor 702 can be switched between a gate voltage of K·$V_{DD}$−|$V_{tp}$| and a gate voltage of K·$V_{DD}$, and the transistor 704 can be switched between a gate voltage of 0V and a gate voltage of $V_{tn}$. Note that $V_{tp}$ designates a threshold voltage of the P-channel MOS transistors, and $V_{tn}$ designates a threshold voltage of the N-channel MOS transistors. Therefore, the transistors 702 and 704 can be switched between a gate voltage of 0V and a gate voltage of K·$V_{DD}$, so that the transistors 702 and 704 can be switched by the clock signal $\phi1$. Also, as shown in FIG. 13, the transistor 705 can be switched between a gate voltage of −K·$V_{DD}$ and a gate voltage of $V_{tn}$−K·$V_{DD}$. Therefore, the transistor 705 can be switched between a gate voltage of −K·$V_{DD}$ and a gate voltage of $V_{DD}$, so that the transistor 705 can be switched by the clock signal $\phi2$. Further, as shown in FIG. 13, the transistor 703 can be switched between a gate voltage of −K·$V_{DD}$ and a gate voltage of $V_{tn}$. Therefore, the transistor 703 can be switched between a gate voltage of −K·$V_{DD}$ and a gate voltage of $V_{DD}$, so that the transistor 703 can be switched by the clock signal $\overline{\phi2}$.

In FIG. 12B, the gates of the transistor 702 receive the clock signal $\phi1$. On the other hand, the gates of the transistors 704 and 705 receive the clock signal $\phi2$ while the gate of the transistor 703 receives the clock signal $\overline{\phi2}$. That is, as shown in FIG. 13, the transistor 502 can be switched between a gate voltage of $K \cdot V_{DD} - |V_{tp}|$ and a gate voltage of $K \cdot V_{DD}$. Therefore, the transistor 702 can be switched between a gate voltage of 0V and a gate voltage of $K \cdot V_{DD}$, so that the transistor 702 can be switched by the clock signal $\phi 1$. Also, as shown in FIG. 13, the transistor 705 can be switched between a gate voltage of $-K \cdot V_{DD}$ and a gate voltage of $V_{tn} - K \cdot V_{DD}$, and the transistor 704 can be switched between a gate voltage of 0V and a gate voltage of $V_{tn}$. Therefore, the transistors 704 and 705 can be switched between a gate voltage of $-K \cdot V_{DD}$ and a gate voltage of $V_{DD}$, so that the transistors 704 and 705 can be switched by the clock signal $\phi 2$. Further, as shown in FIG. 13, the transistor 703 can be switched between a gate voltage of $-K \cdot V_{DD}$ and a gate voltage of $V_{tn}$. Therefore, the transistor 703 can be switched between a gate voltage of $-K \cdot V_{DD}$ and a gate voltage of $V_{DD}$, so that the transistor 703 can be switched by the clock signal $\overline{\phi 2}$.

In FIG. 13, note that since $V_{tp}$ is negative, an ON gate voltage of a P-channel MOS transistor is defined by a gate-to-source voltage of the P-channel MOS transistor equal to $|V_{tp}|$, and an OFF gate voltage is defined by a gate-to-source voltage of the P-channel MOS transistor equal to 0V. Similarly, since $V_{tn}$ is positive, an ON gate voltage of an N-channel MOS transistor is defined by a gate-to-source voltage of the N-channel MOS transistor equal to $V_{tn}$, and an OFF gate voltage is defined by a gate-to-source voltage of the N-channel MOS transistor equal to 0V.

Thus, in the step-up apparatus of FIG. 11, although the two level shift circuits 1 and 2 are necessary, the transistors within the level shift circuits do not need to have a very high breakdown voltage and the (−1)-multiple charge pump circuit 5A is simple, which would decrease the apparatus in cost.

Figure 14:
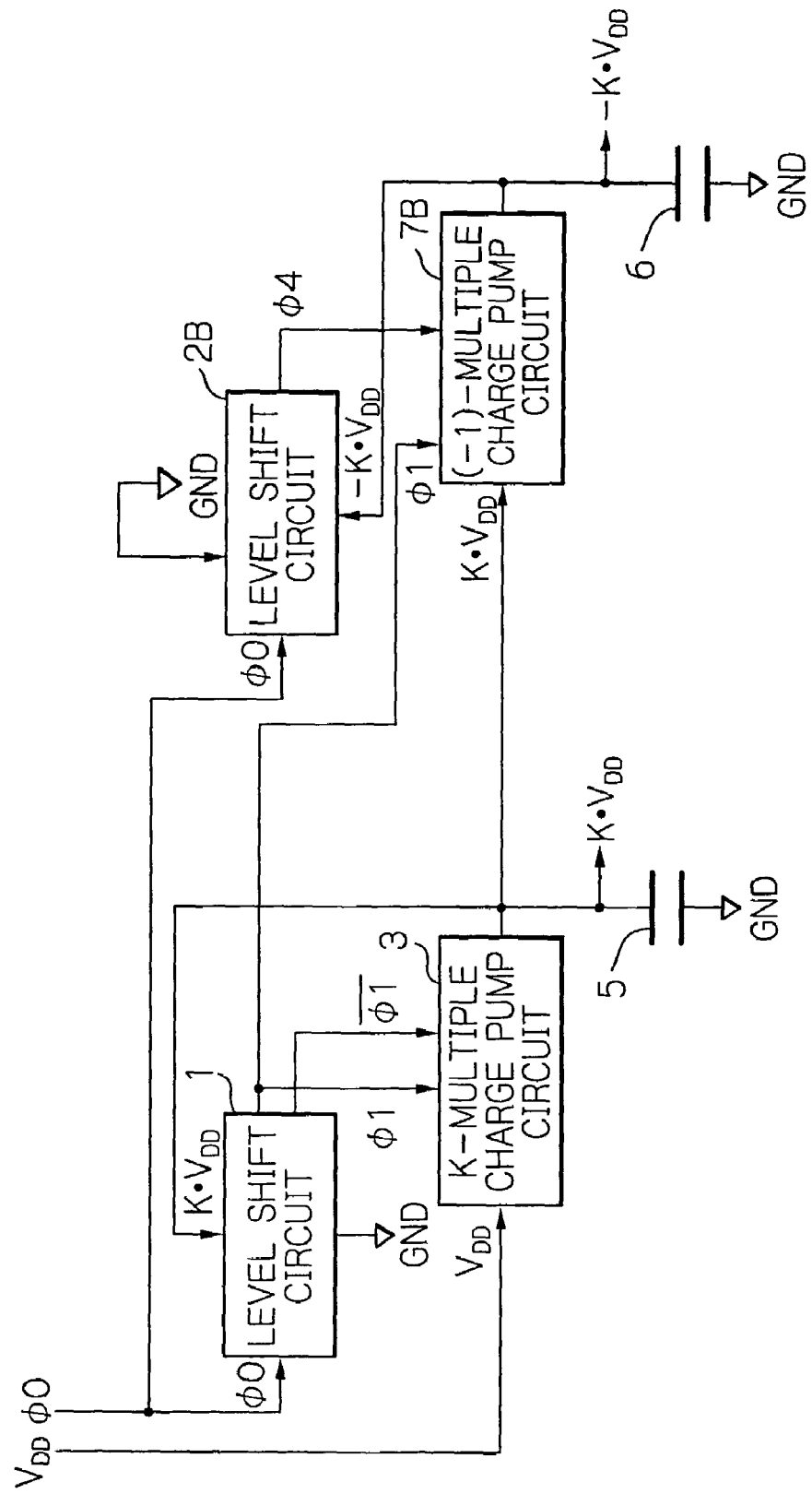
FIG. 14 is a block circuit diagram illustrating a second embodiment of the step-up apparatus according to the present invention.

In FIG. 14, which illustrates a second embodiment of the step-up apparatus according to the present invention, the level shift circuit 2 of FIG. 11 is replaced by a level shift circuit 2B, and the (−1)-multiple charge pump circuit 7A of FIG. 11 is replaced by a (−1)-multiple charge pump circuit 7B.

Figure 15A:
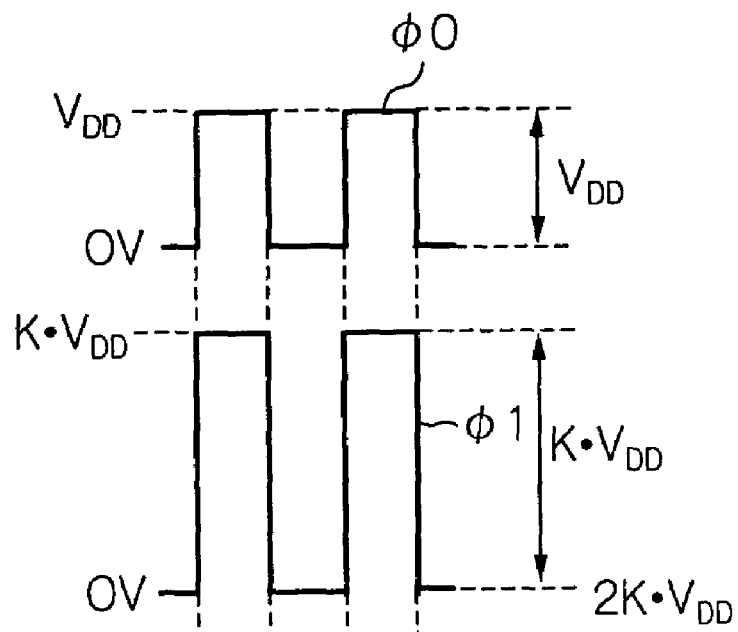
FIGS. 15A, 15B, 15C and 15D are timing diagram showing the clock signals of the step-up apparatus of FIG. 14.
Figure 15B:
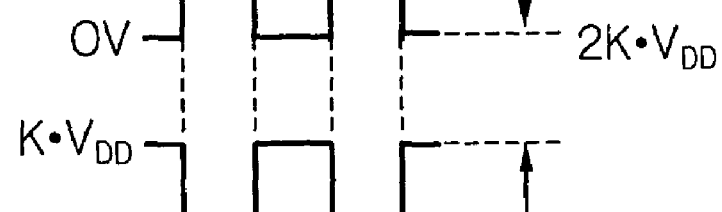
Figure 15C:
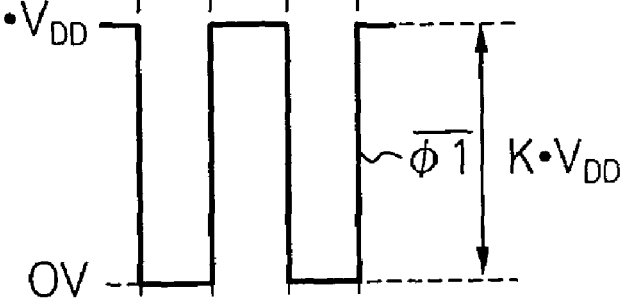
Figure 15D:
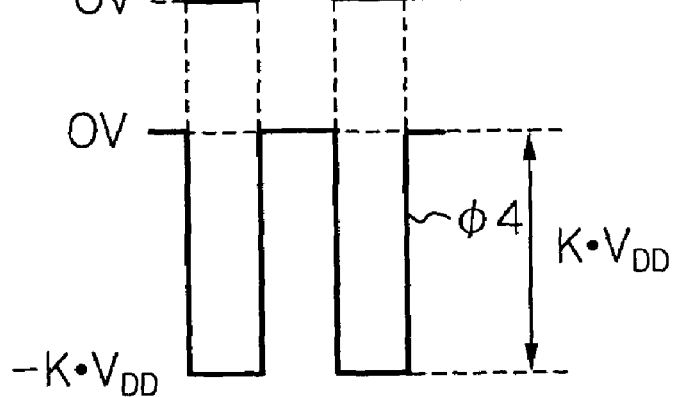

The level shift circuit 2B is powered by the negative voltage $-K \cdot V_{DD}$ and the ground voltage GND to level-shift the clock signal $\phi 1$ as shown in FIG. 15A and, thus generates a clock signal $\phi 4$ as shown in FIG. 15D.

The (−1)-multiple charge circuit 7B steps up the positive voltage $K \cdot V_{DD}$ using the clock signals $\phi 1$ and $\phi 4$ as shown in FIGS. 15B and 15D to generate the negative voltage $-K \cdot V_{DD}$.

Figure 16:
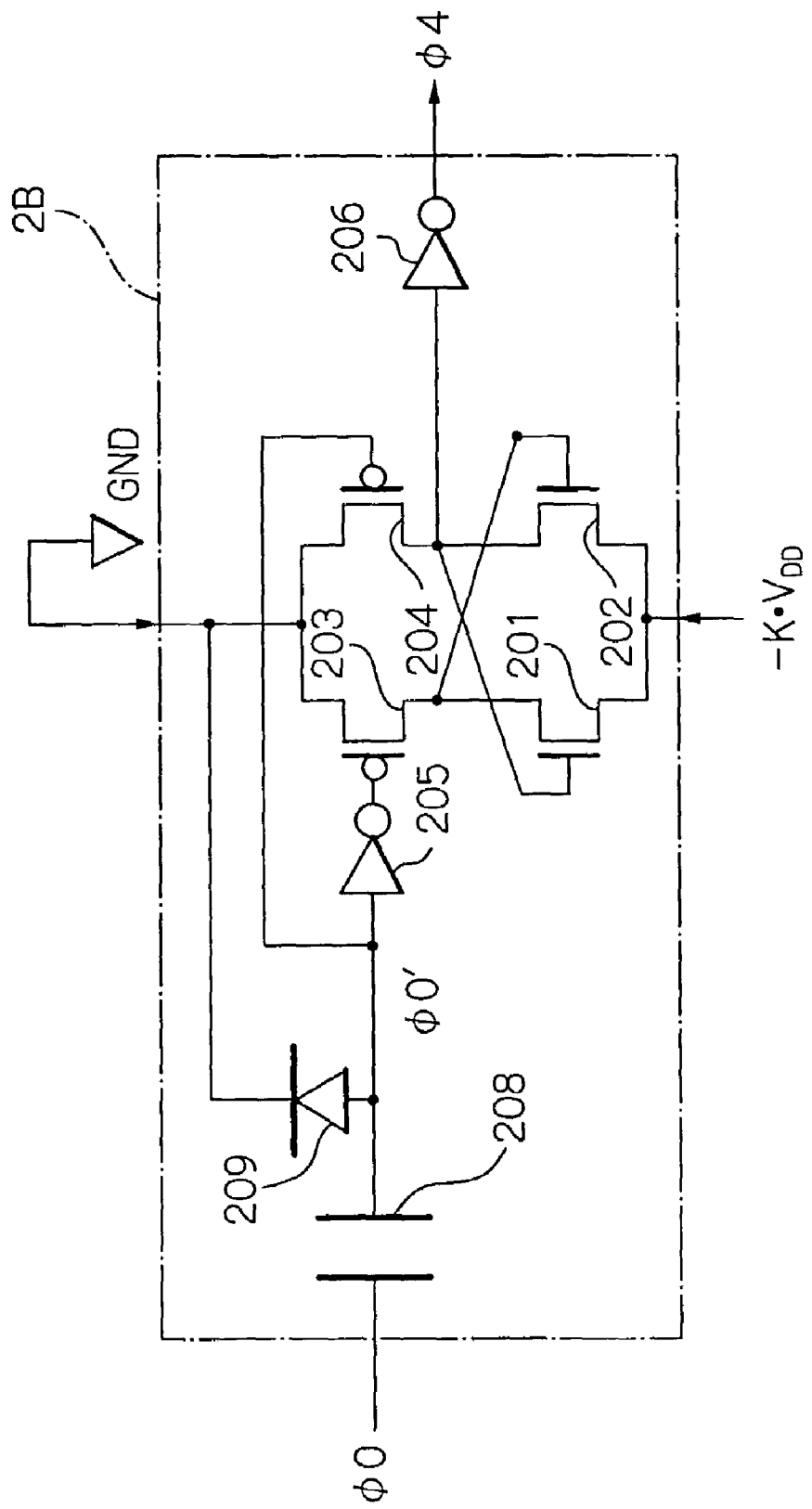
FIG. 16 is a detailed circuit diagram of the level shift circuit of FIG. 14.

In FIG. 16, which is a detailed circuit diagram of the level shift circuit 2B of FIG. 14, a capacitor 208 and a diode 209 which also form a (−1)-multiple charge pump circuit or a polarity inverting circuit are added to the elements of the level shift circuit 2 of FIG. 4, and the CMOS inverter 207 of FIG. 4 is deleted. That is, the polarity inverting circuit formed by the capacitor 208 and the diode 209 generates a clock signal $\phi 0'$ having a voltage swing of $V_{DD}$ between $-V_{DD}$ and 0V. As a result, the CMOS level shifter formed by the transistors 203 to 204 generates the clock signal $\phi 4$ via the CMOS inverter 206. In this case, the transistors 203 to 204 and the CMOS inverters 205 and 206 are powered by the negative voltage $-K \cdot V_{DD}$ and the ground voltage GND. Therefore, the transistors within the level shift circuit 2B need to have a breakdown higher then $K \cdot V_{DD}$. In other words, the transistors within the level shift circuit 2B do not need to have a higher breakdown voltage than those within the level shift circuit 2 of FIG. 1, which would improve the integration of the apparatus.

Figure 17:
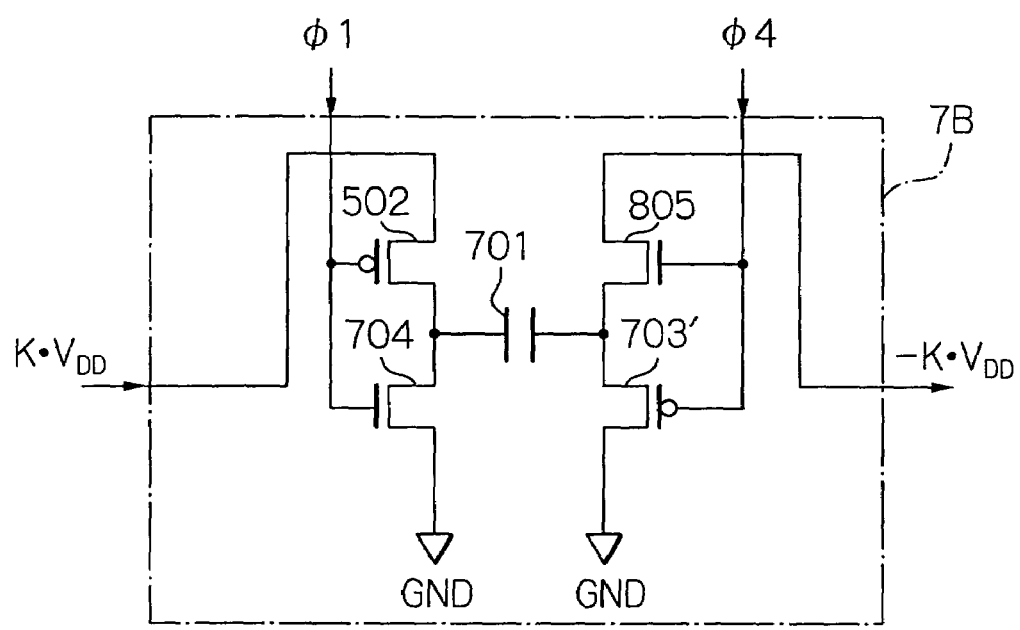
FIG. 17 is a detailed circuit diagram of the (−1)-multiple charge pump circuit of FIG. 14.

In FIG. 17, which is a detailed circuit diagram of the (−1)-multiple charge pump circuit 7B of FIG. 14, the charging N-channel MOS transistor 703 of FIG. 10 is replaced by a charging P-channel MOS transistor 703'.

In FIG. 17, the gates of the transistors 702 and 704 receive the clock signal $\phi 1$. On the other hand, the gates of the transistors 703' and 725 receive the clock signal $\phi 4$. That is, as shown in FIG. 18, the transistor 702 can be switched between a gate voltage of $K \cdot V_{DD} - |V_{tp}|$ and a gate voltage of $K \cdot V_{DD}$, and the transistor 704 can be switched between a gate voltage of 0V and a gate voltage of $V_{tn}$. Therefore, the transistors 702 and 704 can be switched between a gate voltage of 0V and a gate voltage of $K \cdot V_{DD}$, so that the transistors 702 and 704 can be switched by the clock signal $\phi 1$. Also, as shown in FIG. 18, the transistor 705 can be switched between a gate voltage of $-K \cdot V_{DD}$ and a gate voltage of $V_{tn} - K \cdot V_{DD}$, and the transistor 703' can be switched between a gate voltage of $-|V_{tp}|$ and a gate voltage of 0V. Therefore, the transistors 703' and 705 can be switched between a gate voltage of $-K \cdot V_{DD}$ and a gate voltage of 0V, so that the transistors 703' and 705 can be switched by the clock signal $\phi 4$.

Figure 19:
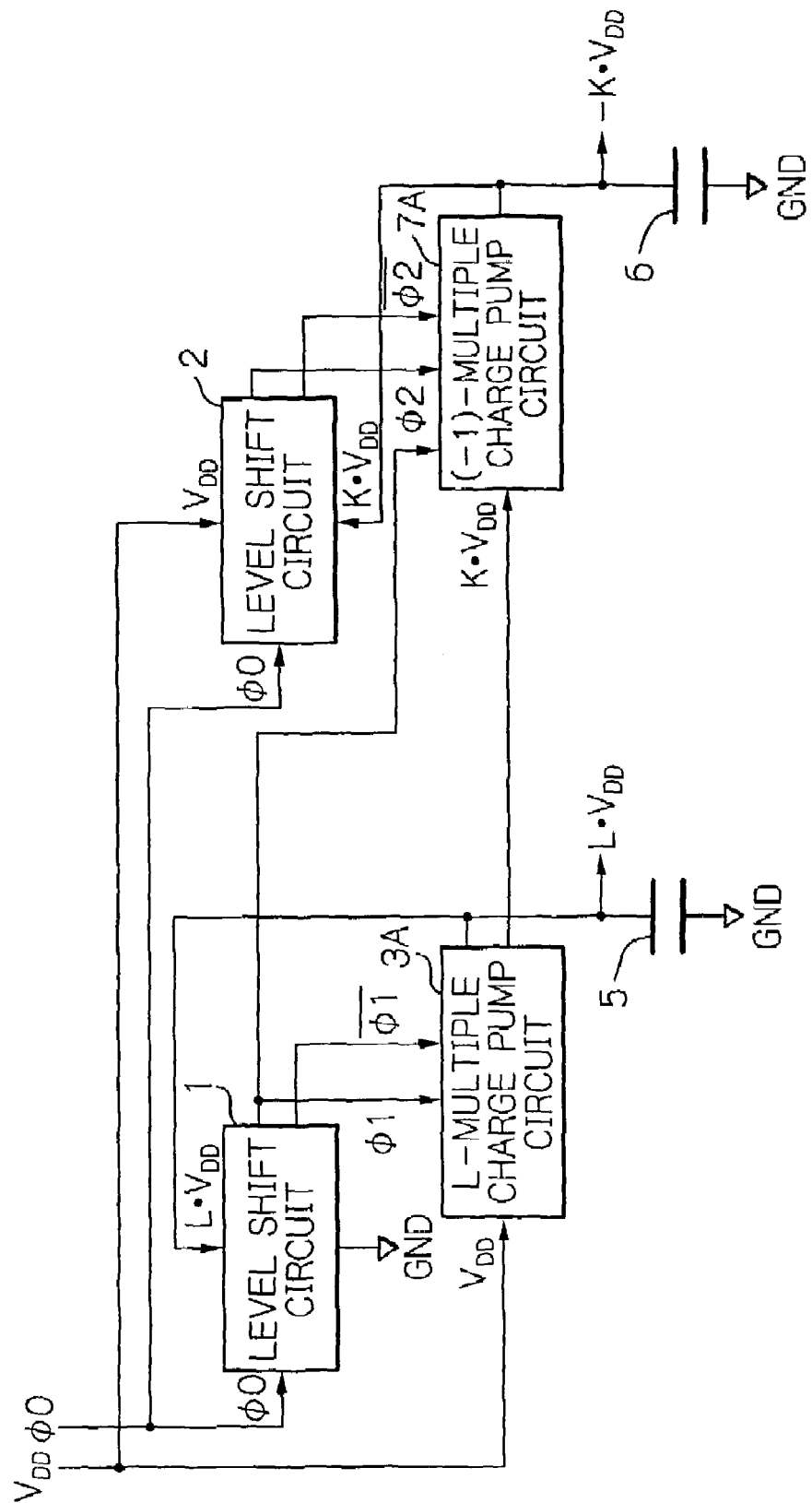
FIG. 19 is a circuit diagram illustrating a first modification of the step-up apparatus of FIG. 10.
Figure 20:
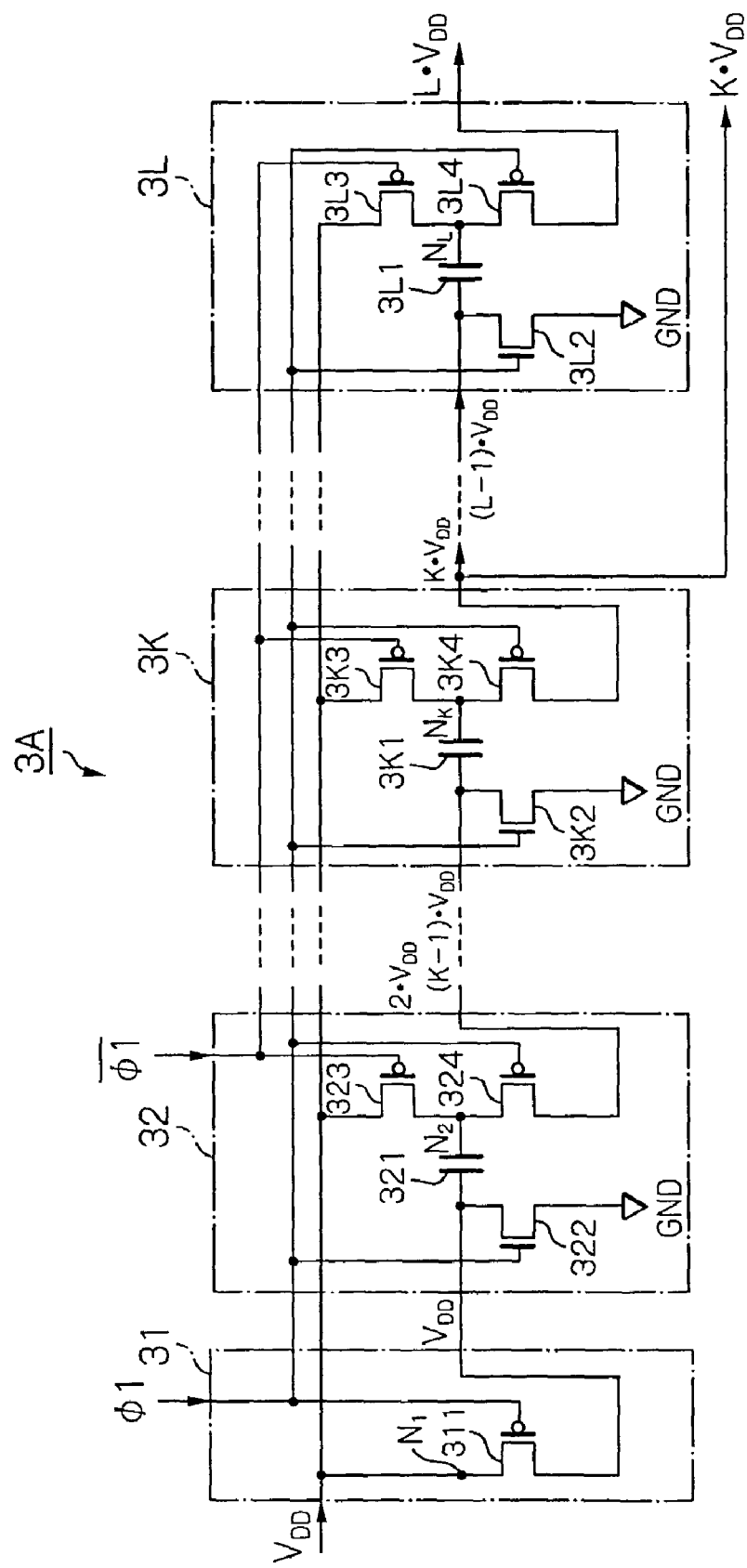
FIG. 20 is a circuit diagram of the L-multiple charge pump circuit of FIG. 19.

In FIG. 19, which illustrates a first modification of the step-up apparatus of FIG. 11, this step-up apparatus generates a positive voltage of $L \cdot V_{DD}$ ($L=3, 4, \ldots$) and a negative voltage $-K \cdot V_{DD}$ ($K=2, 3, \ldots$) where $L>K$. In this case, the K-multiple charge pump circuit 3 of FIG. 11 is replaced by an L-multiple charge pump circuit 3A as illustrated in FIG. 20. That is, the circuit 3K of FIG. 20 generates the positive voltage $K \cdot V_{DD}$ and transmits it to the (−1)-multiple charge pump circuit 7A. On the other hand, a circuit 3L of FIG. 20 generates a positive voltage $L \cdot V_{DD}$ and transmits it to the level shift circuit 1 and the capacitor 5.

Figure 21:
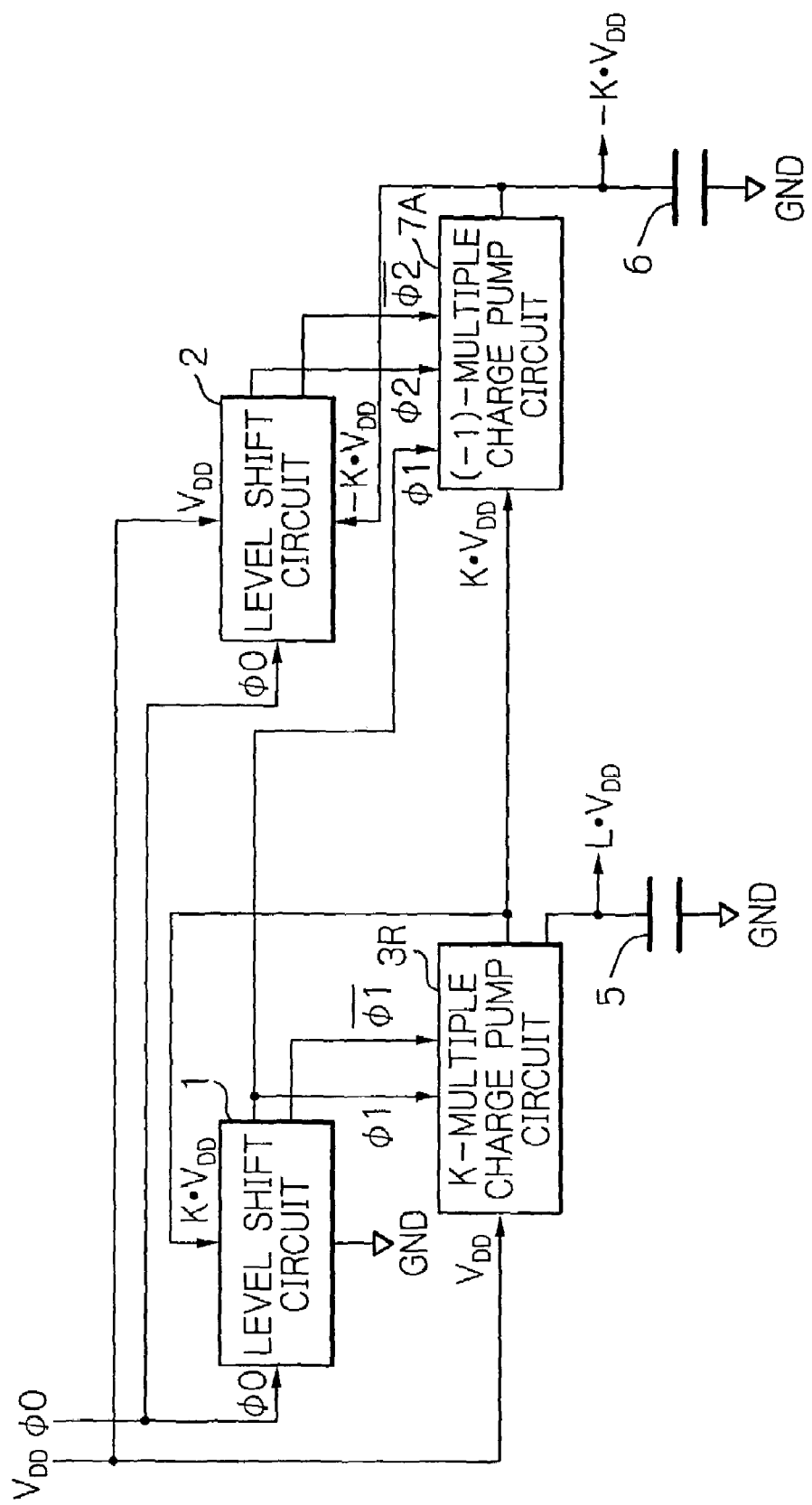
FIG. 21 is a circuit diagram illustrating a second modification of the step-up apparatus of FIG. 10.
Figure 22:
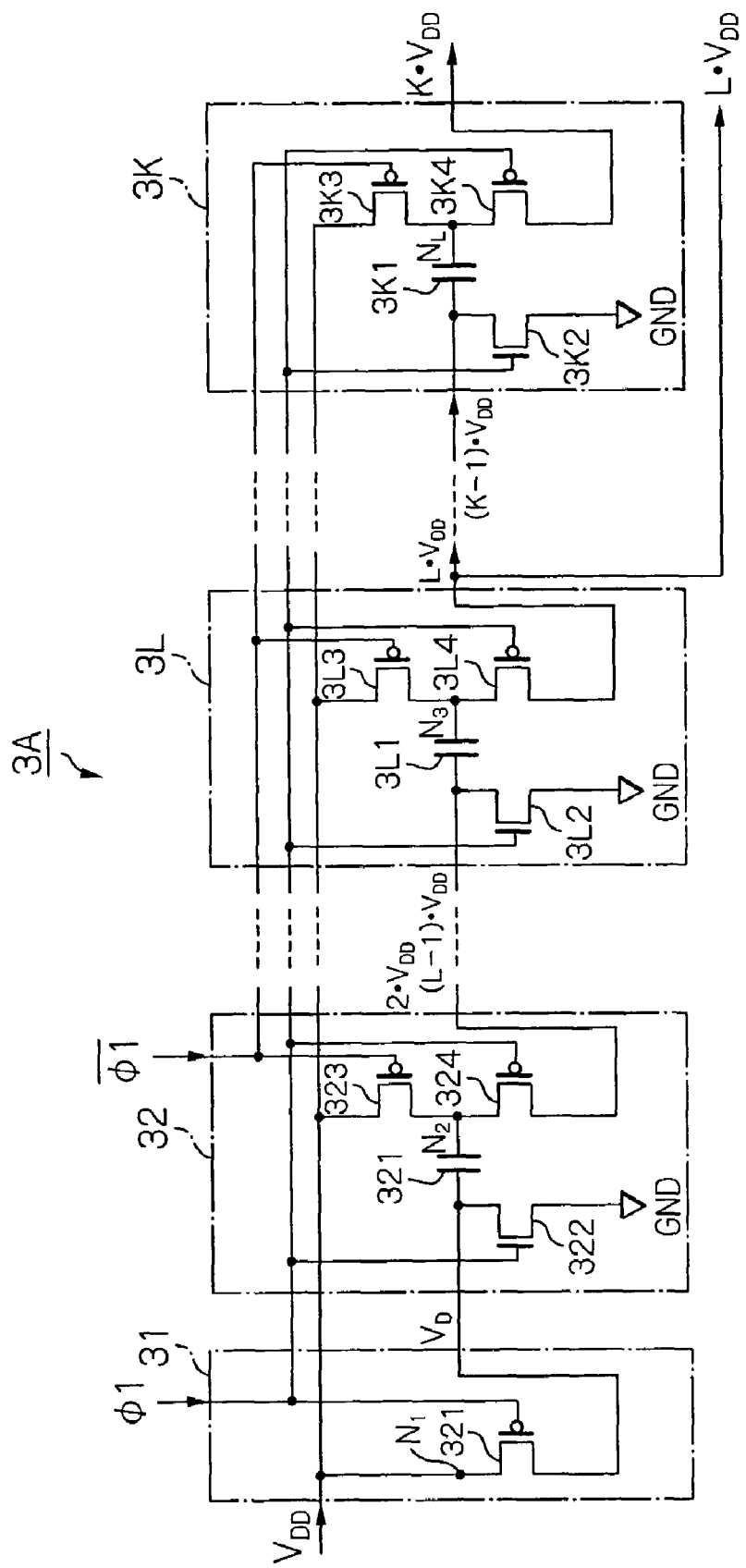
FIG. 22 is a circuit diagram of the K-multiple charge pump circuit of FIG. 21.

In FIG. 21, which illustrates a second modification of the step-up apparatus of FIG. 11, this step-up apparatus generates a positive voltage of $L \cdot V_{DD}$ ($L=2, 3, \ldots$) and a negative voltage $-K \cdot V_{DD}$ ($K=3, 4, \ldots$) where $L<K$. In this case, the K-multiple charge pump circuit 3 of FIG. 11 is replaced by a K-multiple charge pump circuit 3B as illustrated in FIG. 22. That is, a circuit 3L of FIG. 22 generates the positive voltage $L \cdot V_{DD}$ and transmits it to the capacitor 5. On the other hand, a circuit 3K of FIG. 22 generates a positive voltage $K \cdot V_{DD}$ and transmits it to the level shift circuit 1 and the (−1)-multiple charge pump circuit 7A.

Thus, according to the modifications of the first embodiment as illustrated in FIGS. 19 and 21, the absolute values of the positive voltage and the negative voltage can be different from each other.

Figure 23:
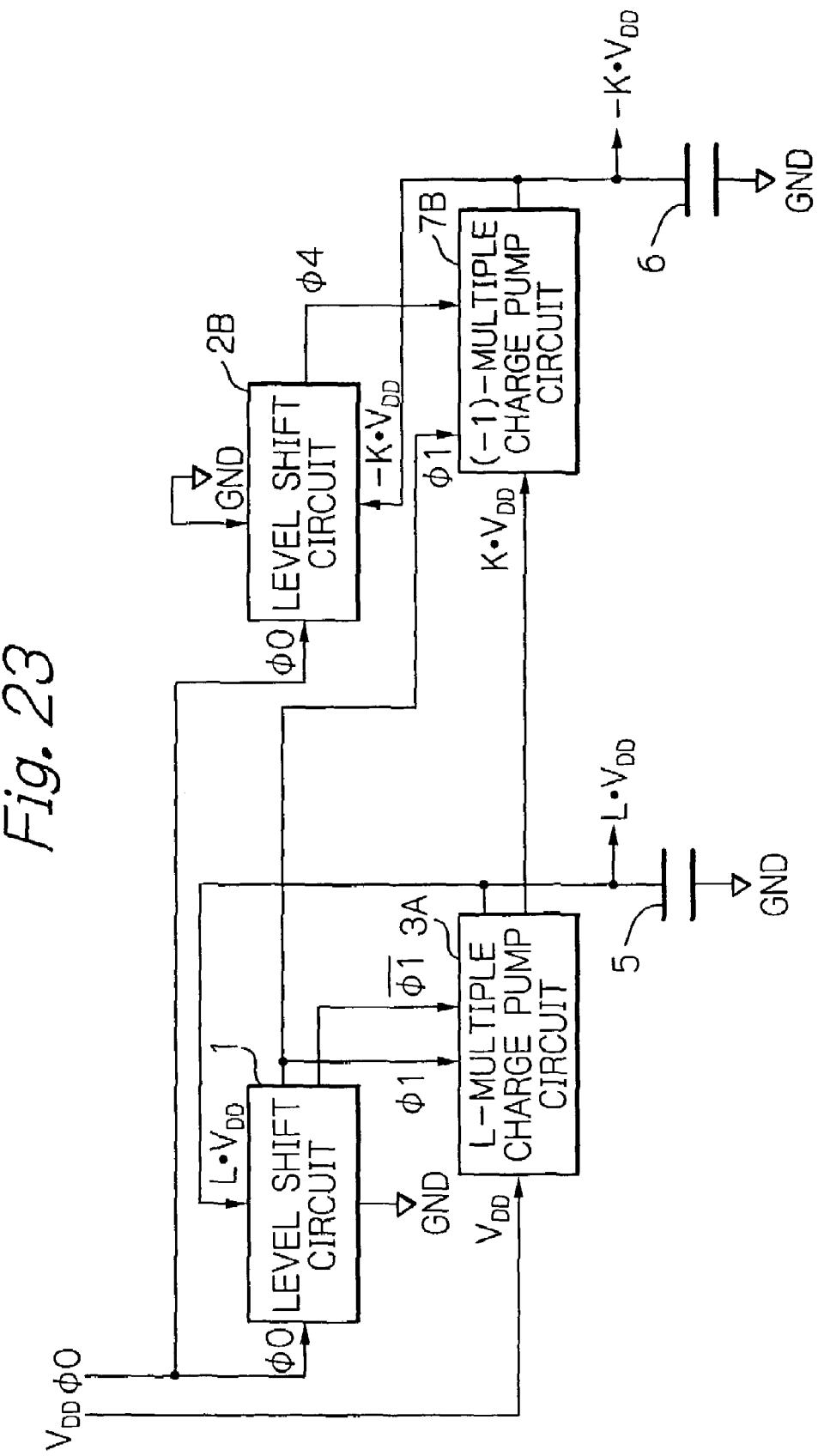
FIG. 23 is a circuit diagram illustrating a first modification of the step-up apparatus of FIG. 14.

In FIG. 23, which illustrates a first modification of the step-up apparatus of FIG. 14, this step-up apparatus generates a positive voltage of $L \cdot V_{DD}$ ($L=3, 4, \ldots$) and a negative voltage $-K \cdot V_{DD}$ ($K=2, 3, \ldots$) where $L>K$. In this case, the K-multiple charge pump circuit 3 of FIG. 14 is replaced by an L-multiple charge pump circuit 3A as illustrated in FIG. 20. That is, the circuit 3K of FIG. 20 generates the positive voltage $K \cdot V_{DD}$ and transmits it to the (−1)-multiple charge pump circuit 7B. On the other hand, a circuit 3L of FIG. 20 generates a positive voltage $L \cdot V_{DD}$ and transmits it to the level shift circuit 1 and the capacitor 5.

Figure 24:
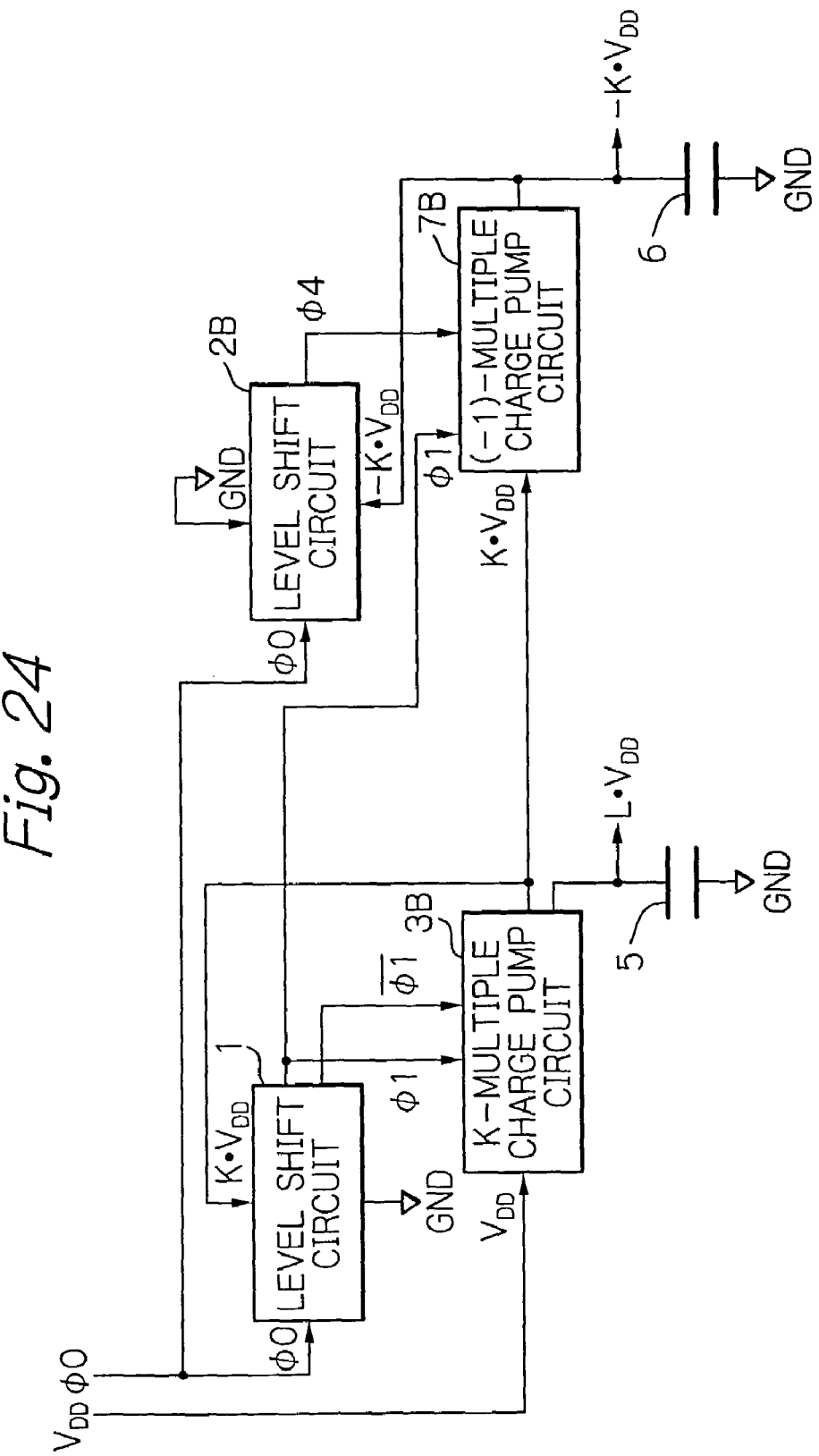
FIG. 24 is a circuit diagram illustrating a second modification of the step-up apparatus of FIG. 14.

In FIG. 24, which illustrates a second modification of the step-up apparatus of FIG. 14, this step-up apparatus generates a positive voltage of $L \cdot V_{DD}$ ($L=2, 3, \ldots$) and a negative voltage $-K \cdot V_{DD}$ ($K=3, 4, \ldots$) where $L<K$. In this case, the K-multiple charge pump circuit 3 of FIG. 14 is replaced by a K-multiple charge pump circuit 3B as illustrated in FIG. 22. That is, a circuit 3L of FIG. 22 generates the positive voltage $L \cdot V_{DD}$ and transmits it to the capacitor 5. On the other hand, a circuit 3K of FIG. 22 generates a positive voltage K·$V_{DD}$ and transmits it to the level shift circuit 1 and the (−1)-multiple charge circuit 7B.

Thus, according to the modifications of the second embodiments as illustrated in FIGS. 23 and 24, the absolute values of the positive voltage and the negative voltage can be different from each other.

Figure 25:
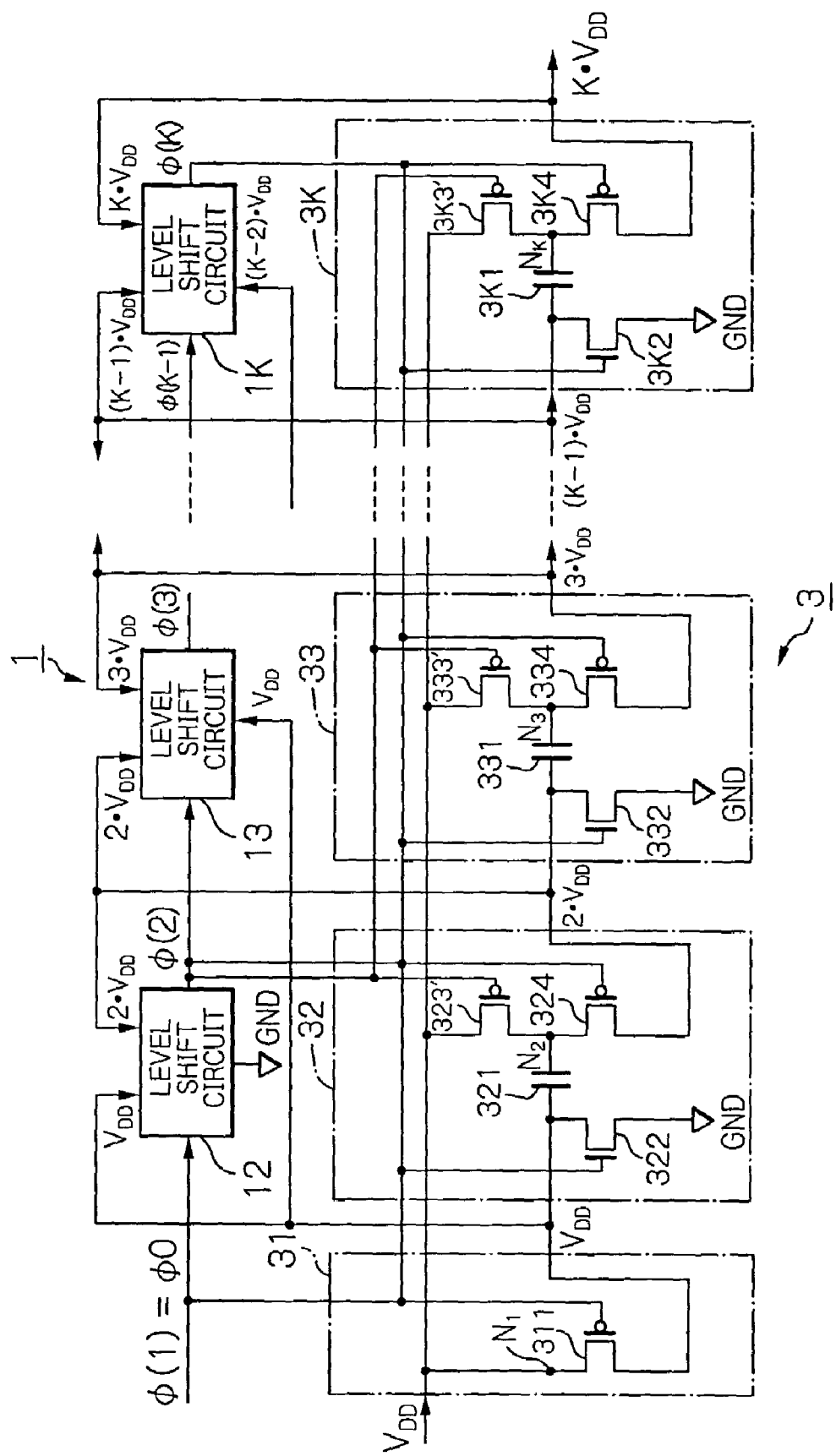
FIG. 25 is a circuit diagram illustrating a modification of the level shift circuit and the K-multiple charge pump circuit of FIGS. 11 and 14.
Figure 26A:
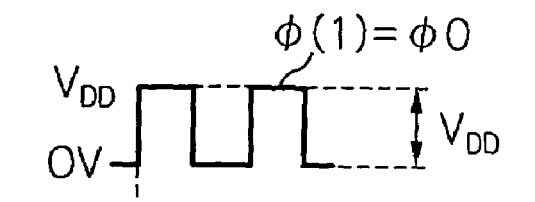
FIGS. 26A, 26B, 26C, 26D and 26E are timing diagrams showing the clock signals of FIG. 25.
Figure 26B:
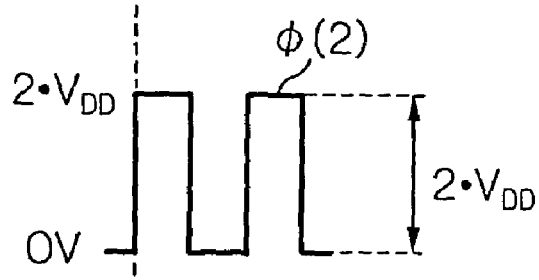
Figure 26C:
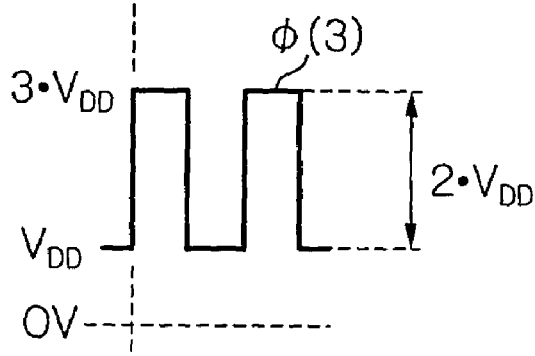
Figure 26D:
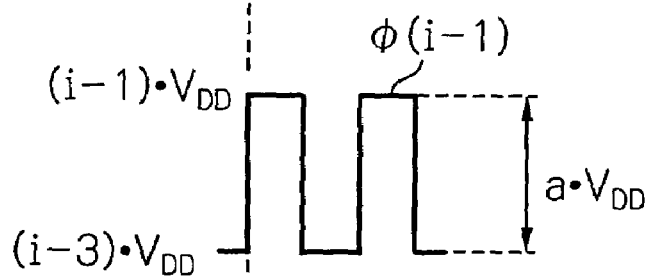
Figure 26E:
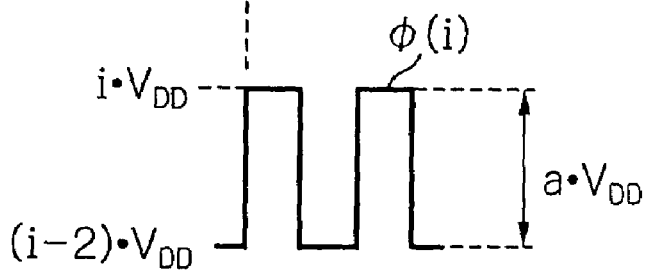

In FIG. 25, which illustrates a modification of the level shift circuit 1 and the K-multiple charge pump circuit 3 of FIGS. 11 and 14, the level shift circuit 1 of FIGS. 11 and 14 is replaced by level shift circuits 12, 13, . . . , 1K corresponding to the circuits 32, 33, . . . , 3K of the K-multiple charge circuit 3. The level shift circuit 12 receives a clock signal φ(1) (=φ0) having a voltage swing of $V_{DD}$ as shown in FIG. 26A to generate a clock signal φ(2) having a voltage swing of 2·$V_{DD}$ as shown in FIG. 26B. The level shift circuit 13 receives a clock signal φ(2) to generate a clock signal φ(3) having a voltage swing of 2·$V_{DD}$ as shown in FIG. 26C. Generally, the level shift circuit 1i (i=4, 5, . . . , K) receives a clock signal φ(i−1) having a voltage swing of 2·$V_{DD}$ between (i−3)·$V_{DD}$ and (i−1)·$V_{DD}$ as shown in FIG. 26D to generate a clock signal (i) having a voltage swing of 2·$V_{DD}$ between (i−2)·$V_{DD}$ and i·$V_{DD}$ as shown in FIG. 26E.

Also, in FIG. 25, the P-channel transistors 323, 333, . . . , 3K3 of FIG. 5 are replaced by N-channel MOS transistors 323', 333' . . . , 3K3', respectively. The gates of the step-up transistors 322, 332, . . . , 3K2 are controlled by the clock signal φ(1) (=φ0) as shown in FIG. 26A. The gates of the charging transistors 323', 333', . . . , 3K3' are controlled by the clock signal φ(2) as shown in FIG. 26B. The gates of the step-up transistors 324, 334, . . . , 3K4 are controlled by the clock signals φ(2), φ(3), . . . , φ(K), respectively.

The operation of the K-multiple charge pump circuit 3 of FIG. 25 is explained next.

First, when the clock signal φ(1) is made high (=$V_{DD}$) so that the clock signal φ(2) is made high (=2·$V_{DD}$), the charging transistors 322, 323', 332, 333', 3K2 and 2K3' are surely turned ON, so that the voltages at nodes $N_2$, $N_3$, . . . , and $N_K$ of the circuits 32, 33, . . . , 3K are made $V_{DD}$. Thus, the capacitors 321, 331, . . . , 3K1 are positively charged by $V_{DD}$. Note that the voltage at node $N_1$ of the circuit 31 is always $V_{DD}$.

In this case, since the clock signals φ(2), φ(3), . . . , φ(K) are at 2·$V_{DD}$, 3·$V_{DD}$, . . . , K·$V_{DD}$, the transistors 324, 334, . . . , 3K4 are surely turned OFF.

Next, when the clock signal φ(1) is made low (=0V) so that the clock signal φ(2) is made low (=0V), the charging transistors 322, 323', 332, 333', . . . , 3K2 and 3K3' are turned OFF. On the other hand, when the clock signals φ(2), φ(3), . . . , φ(K) are at 0V, $V_{DD}$, . . . , (K−2)·$V_{DD}$, the step-up transistors 324, 324, . . . , 3K4 are turned ON while the step-up transistor 311 is turned ON. As a result, the circuit 31 generates a positive voltage of $V_{DD}$. In the circuit 32, $V_{DD}$ is added to the voltage $V_{DD}$ at node $N_2$, so that the voltage at node $N_2$ becomes 2·$V_{DD}$ (=$V_{DD}$+$V_{DD}$). Thus, the circuit 32 generates a voltage of 2·$V_{DD}$. In the circuit 32, 2·$V_{DD}$ is added to the voltage $V_{DD}$ at node $N_2$, so that the voltage at node $N_2$ becomes 3·$V_{DD}$ (=$V_{DD}$+2·$V_{DD}$). Thus, the circuit 32 generates a voltage of 3·$V_{DD}$. In the circuit 3K, (K−1)·$V_{DD}$ is added to the voltage $V_{DD}$ at node $N_2$, so that the voltage at node $N_2$ becomes K·$V_{DD}$ (=$V_{DD}$+(K−1)·$V_{DD}$). Thus, the circuit 3K generates a voltage of K·$V_{DD}$.

Thus, in FIG. 25, the charging transistors 322, 323', 332, 333', . . . , 3K2 and 3K3' are controlled by the clock signal φ(1) and φ(2), regardless of their step-up voltages 2·$V_{DD}$, 3·$V_{DD}$, . . . , K·$V_{DD}$. On the other hand, the step-up transistors 311, 324, 334, . . . , 3K4 are controlled by the clock signals φ(1), φ(2), . . . , φ(K), respectively depending on their step-up voltages $V_{DD}$, 2·$V_{DD}$, 3·$V_{DD}$, . . . , K·$V_{DD}$.

Figure 27:
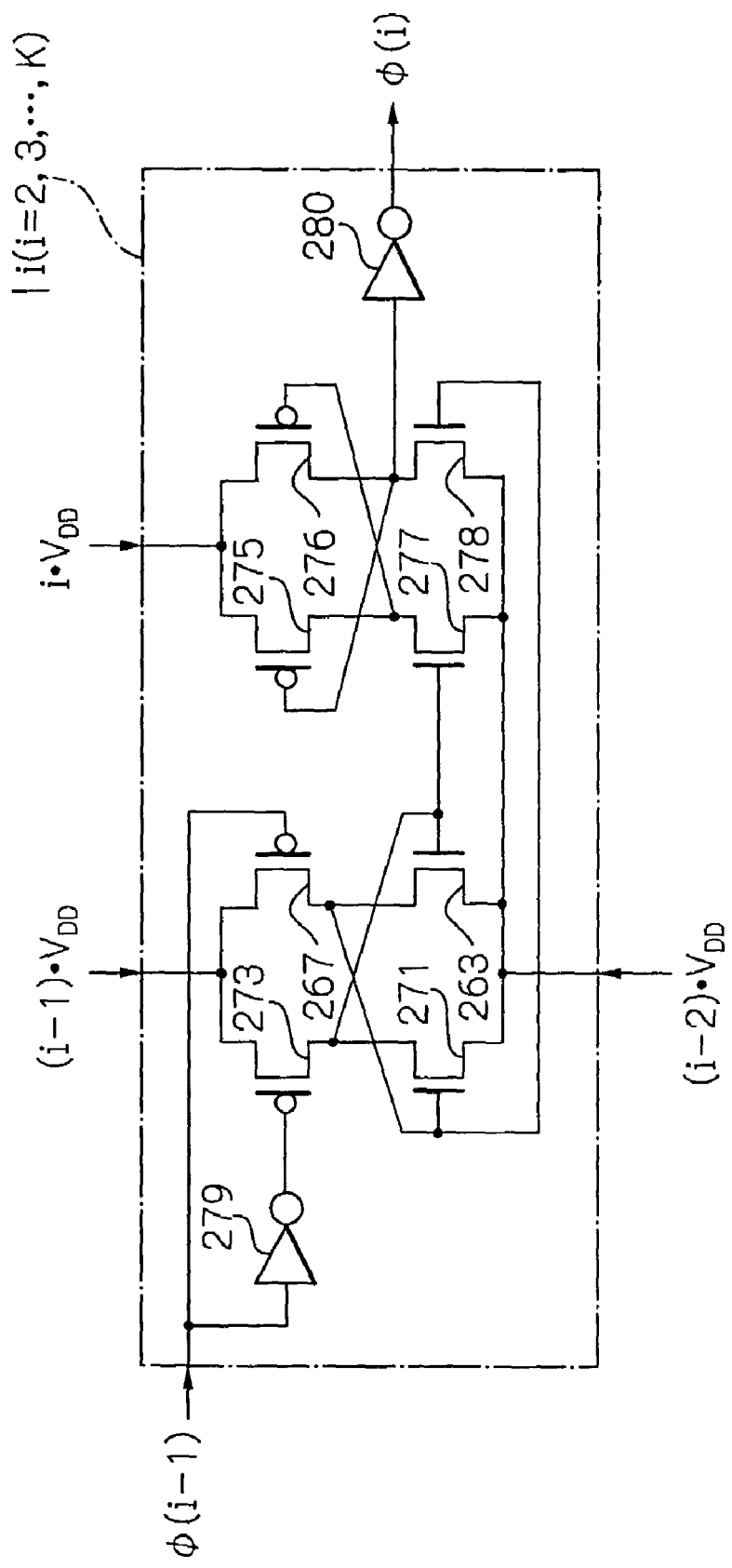
FIG. 27 is a detailed circuit diagram of the level shift circuit of FIG. 25.

In FIG. 27, which is a detailed circuit diagram of the level shift circuit 1i (i=2, 3, . . . , K) of FIG. 25, a first CMOS level shifter formed by cross-coupled load N-channel MOS transistors 271 and 272 and P-channel drive MOS transistors 273 and 274 is powered by a voltage (i−2)·$V_{DD}$ and a voltage (i−1)·$V_{DD}$, and also, a second CMOS level shifter formed by cross-coupled load P-channel MOS transistors 275 and 276 and drive N-channel drive MOS transistors 277 and 278 is powered by the voltage (i−2)·$V_{DD}$ and the voltage i·$V_{DD}$. The gate of the transistor 273 receives an inverted signal of the clock signal φ(i−1) via a CMOS inverter 279 while the gate of the transistor 274 receives the clock signal φ(i−1). Also, the gate of the transistor 277 receives a voltage at the drain of the transistor 273 while the gate of the transistor 278 receives a voltage at the drain of the transistor 274. As a result, the second CMOS level shifter generates the clock signal φ(i) having a voltage swing 2K·$V_{DD}$ via a CMOS inverter 280. In this case, the CMOS inverter 279 is powered by the voltage (i−2)·$V_{DD}$ and the voltage (i−1)·$V_{DD}$, while the CMOS inverter 280 is powered by the voltage (i−2)·$V_{DD}$ and the voltage i·$V_{DD}$. Therefore, the transistors within the level shift circuit 2 need to have a breakdown voltage higher than 2·$V_{DD}$.

Thus, in FIG. 25, although the number of level shift circuits is increased, the transistors therein do not need to have a high breakdown voltage, thus improving the integration. Additionally, in the level shift circuit as illustrated in FIG. 3 or 4, the power consumption is proportional to (K·$V_{DD}$)² (=K²·$V_{DD}$²). On the other hand, in the level shift circuit as illustrated in FIG. 25, the power consumption is proportional to (K−1)·(2·$V_{DD}$)² (=4(K−1)·$V_{DD}$²). Therefore, if K>3, the power consumption can be decreased.

Figure 28:
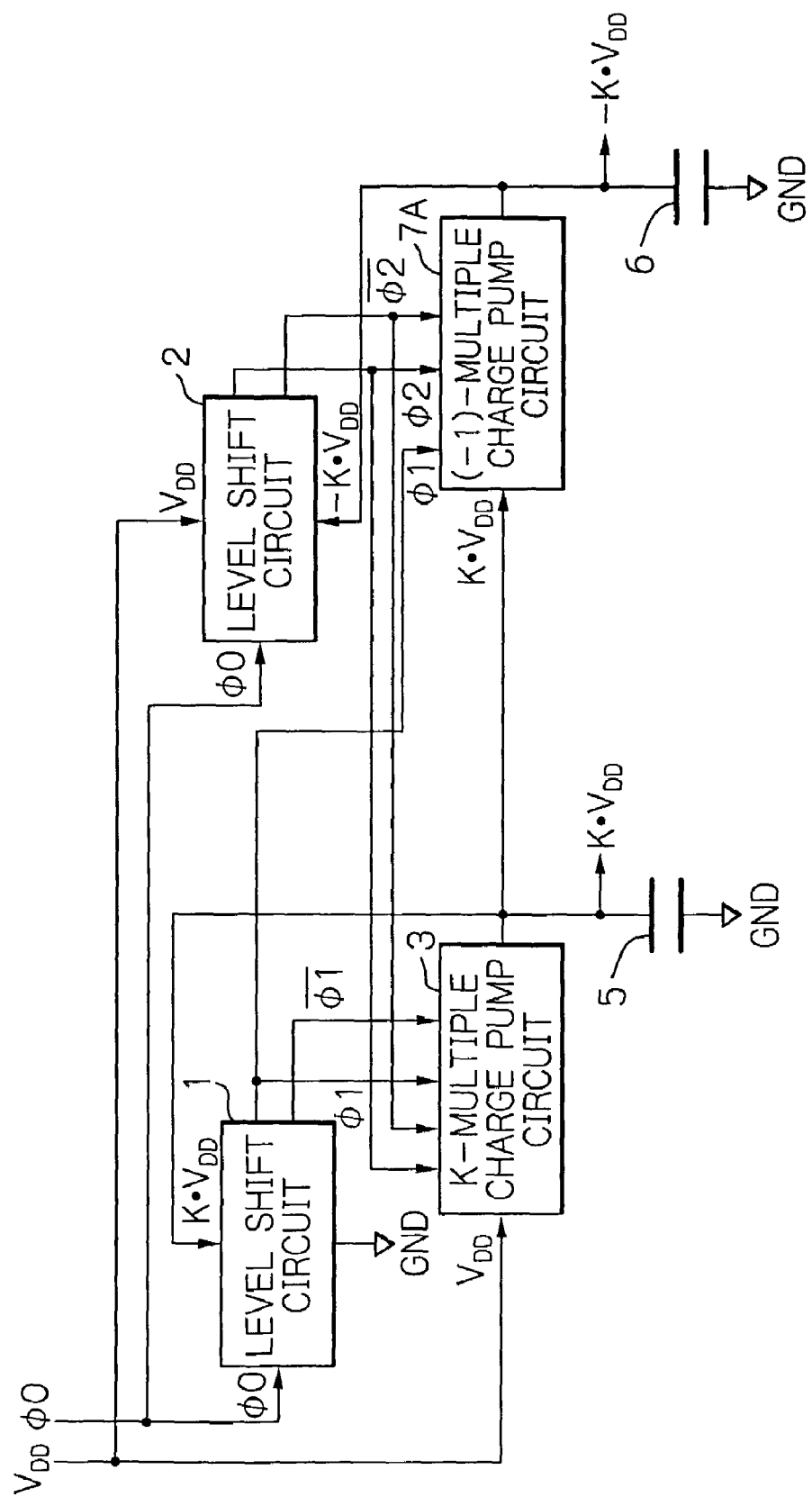
FIG. 28 is a block circuit diagram illustrating a third embodiment of the step-up apparatus according to the present invention.
Figure 29:
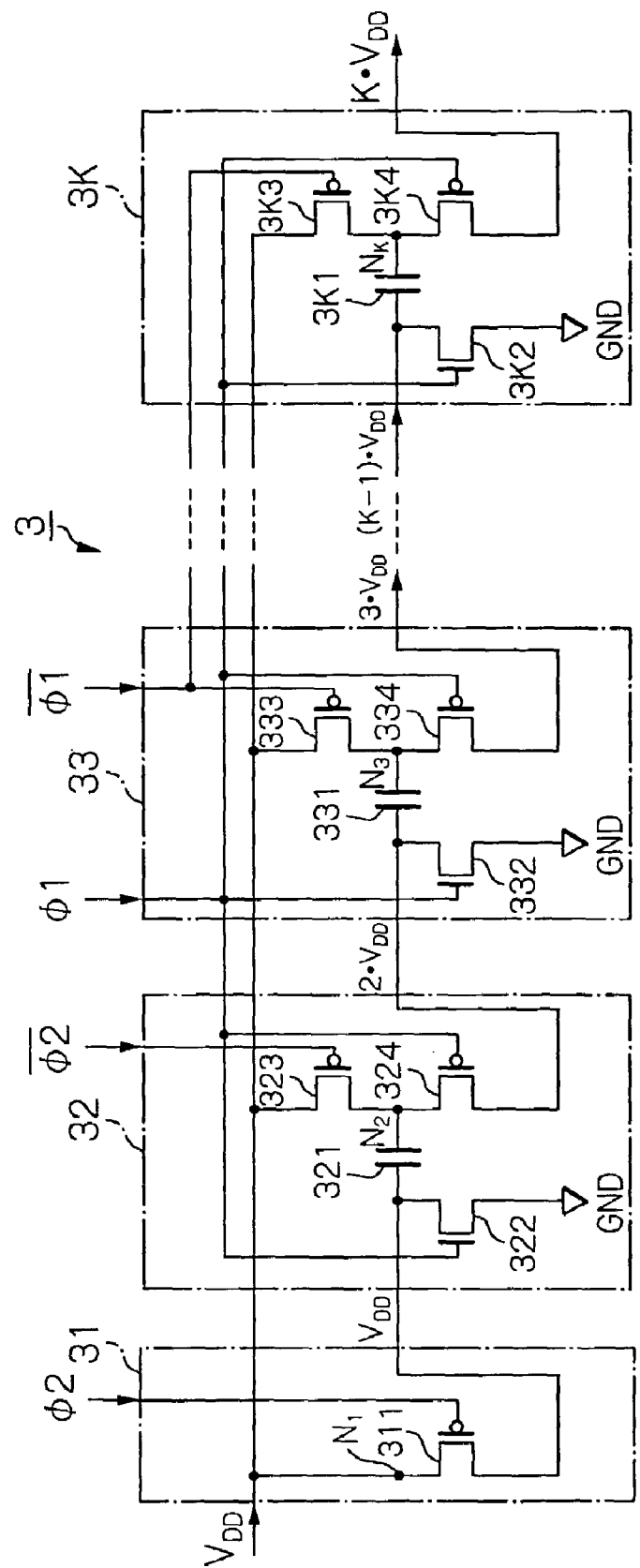
FIG. 29 is a detailed circuit diagram of the K-multiple charge pump circuit of FIG. 28.

In FIG. 28, which illustrates a third embodiment of the step-up apparatus according to the present invention, the clock signals φ2 and $\overline{\phi 2}$ generated from the level shift circuit 2 of FIG. 11 are also supplied to the K-multiple charge pump circuit 3. In more detail, as illustrated in FIG. 29, which is a detailed circuit diagram of the K-multiple charge up circuit 3 of FIG. 28, the clock signal φ2 is supplied to the gate of the P-channel MOS transistor 311 and the clock signal $\overline{\phi 2}$ is supplied to the P-channel MOS transistor 323.

As shown in FIG. 30, all the transistors 311, 322, 323 and 324 can be switched between a gate voltage of 0V and a gate voltage of K·$V_{DD}$. Additionally, the transistors 311 and 323 can be switched between a gate voltage of −K·$V_{DD}$ and a gate voltage of $V_{DD}$. In FIG. 28, use is made of this fact, so that the gate-to-source voltage can be increased to decrease the ON-resistance of the transistors 311 and 323 when they are turned ON.

Figure 31:
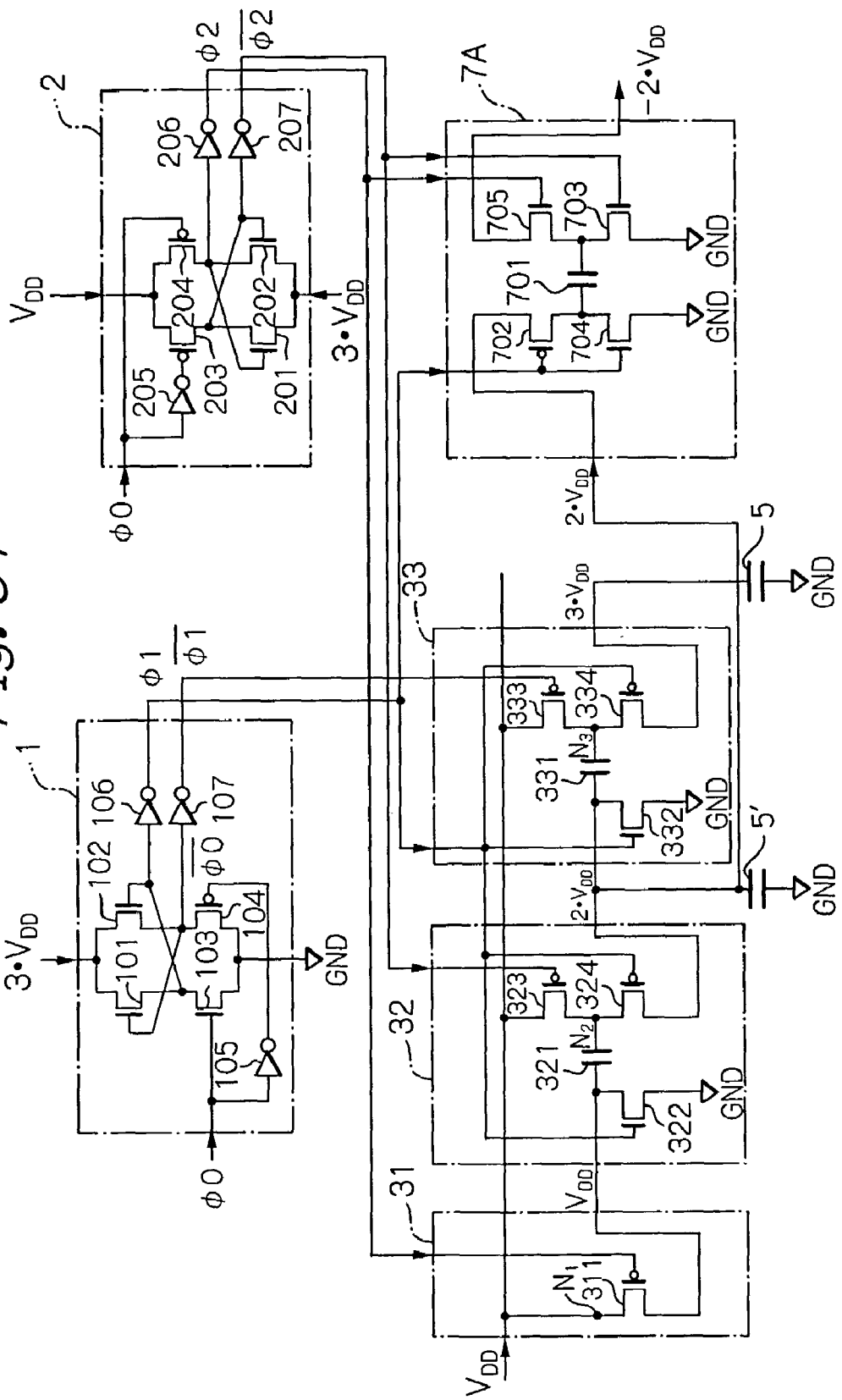
FIG. 31 is a circuit diagram of the step-up apparatus of FIG. 28 applied to an LCD apparatus.

An example of the push-up apparatus of FIG. 28 applied to a step-up circuit of an LCD apparatus is illustrated in FIG. 31.

In FIG. 31, a voltage 2·$V_{DD}$ is generated from the circuit 32 and stored in a capacitor 5'. The voltage 2·$V_{DD}$ is supplied to a data line driving circuit of the LCD apparatus. On the other hand, a voltage 3·$V_{DD}$ is generated from the circuit 33 and is stored in the capacitor 5. The voltage 3·$V_{DD}$ is supplied to a gate line driving circuit of the LCD apparatus. Also, the voltage 2·$V_{DD}$, not the voltage 3·$V_{DD}$, is supplied to the (−1)-multiple charge pump circuit (polarity inverting circuit) 7A to generate a voltage −2·$V_{DD}$. The voltage −2·$V_{DD}$ is supplied to the gate line driving circuit of the LCD apparatus.

As explained hereinabove, according to the present invention, since the breakdown voltage of transistors within the level shift circuits can be lowered, the integration can be improved.

What is claimed is:

1. A step-up apparatus comprising:
   a first level shift circuit for receiving a first clock signal to generate two phase-opposite second clock signals;
   a second level shift circuit for receiving said first clock signal to generate two phase-opposite third clock signals;
   a charge pump circuit, connected to said first level shift circuit, for stepping up a power supply voltage at a power supply voltage terminal using said second clock signals to generate a positive voltage; and
   a polarity inverting circuit, connected to said charge pump circuit and said second level shift circuit, for inverting said positive voltage using said third clock signals to generate a negative voltage whose absolute value is the same as said positive voltage,
   a high level of said second clock signals being not higher than said positive voltage,
   a low level of said second clock signals being not lower than a voltage at a ground terminal,
   a high level of said third clock signals being not higher than said power supply voltage,
   a low level of said third clock signals being not lower than said negative voltage.

2. The step-up apparatus as set forth in claim 1, wherein said first level shift circuit comprises:
   first and second cross-coupled load P-channel MOS transistors whose sources receive said positive voltage; and
   first and second N-channel drive MOS transistors whose drains are connected to drains of said first and second cross-coupled load P-channel MOS transistors, respectively,
   gates of said first and second N-channel drive MOS transistors receiving said first clock signal and its inverted signal, respectively,
   the drains of said first and second N-channel drive MOS transistors generating said second clock signals.

3. The step-up apparatus as set forth in claim 1, wherein said second level shift circuit comprises:
   first and second cross-coupled N-channel Load MOS transistors whose sources receive said voltage at said ground terminal; and
   third and second P-channel drive MOS transistors whose sources receive said power supply voltage and whose drains are connected to drains of said first and second cross-coupled load N-channel MOS transistors, respectively,
   gates of said first and second drive P-channel MOS transistors receiving said first clock signal and its inverted signal, respectively,
   the drains of said first and second P-channel drive MOS transistors generating said third clock signals.

4. The step-up apparatus as set forth in claim 1, wherein said charge pump circuit comprises:
   a first circuit including a first step-up switching element, connected to said power supply voltage terminal, for generating said power supply voltage; and
   an i-th (i=2, 3, . . . , K) circuit including a charging capacitor, a first charging element connected between said ground terminal and said charging capacitor, a second charging element connected between said charging capacitor and said power supply voltage terminal, and a second step-up switching element connected to said charging capacitor and said second charging element for generating an "i" times said power supply voltage.

5. The step-up apparatus as set forth in claim 4, wherein each of said first and second step-up switching elements comprises a P-channel MOS transistor controlled by one of said second clock signals,
   said first charging element comprises an N-channel MOS transistor controlled by the one of said second clock signals, and
   said second charging element comprises a P-channel MOS transistor controlled by the other of said second clock signals.

6. The step-up apparatus as set forth in claim 1, wherein said charge pump circuit steps up said power supply voltage further using said third clock signals, said pump circuit comprising:
   a first circuit including a first step-up switching element, connected to said power supply voltage terminal, for generating said power supply voltage; and
   an i-th (i=2, 3, . . . , K) circuit including a charging capacitor, a first charging element connected between said ground terminal and said charging capacitor, a second charging element connected between said charging capacitor and said power supply voltage terminal, and a second step-up switching element connected to said charging capacitor and said second charging element for generating an "i" times said power supply voltage,
   said first step-up switching element comprising a P-channel MOS transistor controlled by one of said third clock signals,
   said second charging element of said 2-nd circuit comprising a P-channel MOS transistor controlled by the other of said third clock signals,
   said first charging element of said i-th (i=2, 3, . . . ) circuit comprising an N-channel MOS transistor controlled by the one of said second clock signals,
   said second charging element of said i-th (i=3, 4, . . . ) circuit comprising a P-channel MOS transistor controlled by the other of said second clock signals,
   said second step-up switching element comprising a P-channel MOS transistor controlled by the other of said second clock signal.

7. A step-up apparatus comprising:
   a first level shift circuit for receiving a clock first signal to generate two phase-opposite second clock signals;
   a second level shift circuit for receiving said first clock signal to generate a third clock signal;
   a charge pump circuit, connected to said first level shift circuit, for stepping up a power supply voltage at a power supply voltage terminal using said second clock signals to generate a positive voltage; and
   a polarity inverting circuit, connected to said charge pump circuit and said second level shift circuit, for inverting said positive voltage using said third clock signal to generate a negative voltage whose absolute value is the same as said positive voltage,
   a high level of said second clock signals being not higher than said positive voltage,
   a low level of said second clock signals being not lower than a voltage at a ground terminal,
   a high level of said third clock signal being not higher than said voltage at said ground voltage,
   a low level of said third clock signal being not lower than said negative voltage.

8. The step-up apparatus as set forth in claim 7, wherein said first level shift circuit comprises:
first and second cross-coupled load P-channel MOS transistors whose sources receive said positive voltage; and
first and second N-channel drive MOS transistors whose drains are connected to drains of said first and second cross-coupled load P-channel MOS transistors, respectively,
gates of said first and second N-channel drive MOS transistors receiving said first clock signal and its inverted signal, respectively,
the drains of said first and second N-channel drive MOS transistors generating said second clock signals.

9. The step-up apparatus as set forth in claim 7, wherein said second level shift circuit comprises:
a polarity inverting circuit for inverting said first clock signal;
first and second cross-coupled N-channel Load MOS transistors whose sources receive said negative voltage; and
third and second P-channel drive MOS transistors whose sources receive said voltage at said ground terminal and whose drains are connected to drains of said first and second cross-coupled load N-channel MOS transistors, respectively,
gates of said first and second drive P-channel MOS transistors receiving an output signal of said polarity inverting circuit and its inverted signal, respectively,
the drain of one of said first and second P-channel drive MOS transistors generating said third clock signal.

10. The step-up apparatus as set forth in claim 9, wherein said polarity inverting circuit comprises a capacitor for receiving said first clock signal and a diode between said capacitor and said ground terminal.

11. The step-up apparatus as set forth in claim 7, wherein said charge pump circuit comprises:
a first circuit including a first step-up switching element, connected to said power supply voltage terminal, for generating said power supply voltage; and
an i-th (i=2, 3, . . . , K) circuit including a charging capacitor, a first charging element connected between said ground terminal and said charging capacitor, a second charging element connected between said charging capacitor and said power supply voltage terminal, and a second step-up switching element connected to said charging capacitor and said second charging element for generating an "i" times said power supply voltage.

12. The step-up apparatus as set forth in claim 11, wherein each of said first and second step-up switching elements comprises a P-channel MOS transistor controlled by one of said second clock signals,
said first charging element comprising an N-channel MOS transistor controlled by the one of said second clock signals,
said second charging element comprising a P-channel MOS transistor controlled by the other of said second clock signals.

13. A step-up apparatus comprising:
a first level shift circuit for receiving a clock first signal to generate two phase-opposite second clock signals;
a second level shift circuit for receiving said first clock signal to generate two phase-opposite third clock signals;
a charge pump circuit, connected to said first level shift circuit, for stepping up a power supply voltage at a power supply voltage terminal using said second clock signals to generate first and second positive voltages, said first positive voltage being smaller than said second positive voltage; and
a polarity inverting circuit, connected to said charge pump circuit and said second level shift circuit, for inverting said second positive voltage using said third clock signals to generate a negative voltage whose absolute value is the same as said second positive voltage,
a high level of said second clock signals being not higher than said second positive voltage,
a low level of said second clock signals being not lower than a voltage at a ground terminal,
a high level of said third clock signals being not higher than said power supply voltage,
a low level of said third clock signals being not lower than said negative voltage.

14. The step-up apparatus as set forth in claim 13, wherein said first level shift circuit comprises:
first and second cross-coupled load P-channel MOS transistors whose sources receive said second positive voltage; and
first and second N-channel drive MOS transistors whose drains are connected to drains of said first and second cross-coupled load P-channel MOS transistors, respectively,
gates of said first and second N-channel drive MOS transistors receiving said first clock signal and its inverted signal, respectively,
the drains of said first and second N-channel drive MOS transistors generating said second clock signals.

15. The step-up apparatus as set forth in claim 13, wherein said second level shift circuit comprises:
first and second cross-coupled N-channel load MOS transistors whose sources receive said voltage as said ground terminal; and
third and second P-channel drive MOS transistors whose sources receive said power supply voltage and whose drains are connected to drains of said first and second cross-coupled load N-channel MOS transistors, respectively,
gates of said first and second drive P-channel MOS transistors receiving said first clock signal and its inverted signal, respectively,
the drains of said first and second P-channel drive MOS transistors generating said third clock signals.

16. The step-up apparatus as set forth in claim 13, wherein said charge pump circuit comprises:
a first circuit including a first step-up switching element, connected to said power supply voltage terminal, for generating said power supply voltage; and
an i-th (i=2, 3, . . . , K) circuit including a charging capacitor, a first charging element connected between said ground terminal and said charging capacitor, a second charging element connected between said charging capacitor and said power supply voltage terminal, and a second step-up switching element connected to said charging capacitor and said second charging element for generating an "i" times said power supply voltage,
said L-th (L=2, 3, . . . , K−1) circuit generating said first positive voltage,
said K-th (K>L) circuit generating said second positive voltage.

17. The step-up apparatus as set forth in claim 16, wherein each of said first and second step-up switching elements comprises a P-channel MOS transistor controlled by one of said second clock signals, said first charging element comprising an N-channel MOS transistor controlled by the one of said second clock signals, said second charging element comprising a P-channel MOS transistor controlled by the other of said second clock signals.

18. The step-up apparatus as set forth in claim 13, wherein said charge pump circuit steps up said power supply voltage further using said third clock signals, said charge pump circuit further comprising:

a first circuit including a first step-up switching element, connected to said power supply voltage terminal, for generating said power supply voltage; and an i-th (i=2, 3, . . . , K) circuit including a charging capacitor, a first charging element connected between said ground terminal and said charging capacitor, a second charging element connected between said charging capacitor and said power supply voltage terminal, and a second step-up switching element connected to said charging capacitor and said second charging element for generating an "i" times said power supply voltage, said first step-up switching element comprising a P-channel MOS transistor controlled by one of said third clock signals, said second charging element of said 2-nd circuit comprising a P-channel MOS transistor controlled by the other of said third clock signals, said first charging element of said i-th (i=2, 3, . . . ,K) circuit comprising an N-channel MOS transistor controlled by the one of said second clock signals, said second charging element of said i-th (i=3, 4, . . . , K) circuit comprising a P-channel MOS transistor controlled by the other of said second clock signals, said second step-up switching element comprising a P-channel MOS transistor controlled by the other of said second clock signal, said L-th (L=2, 3, . . . , K−1) circuit generating said first positive voltage, said K-th (K>L) circuit generating said second positive voltage.

19. A step-up apparatus comprising:

a first level shift circuit for receiving a clock first signal to generate two phase-opposite second clock signals;

a second level shift circuit for receiving said first clock signal to generate a third clock signal;

a charge pump circuit, connected to said first level shift circuit, for stepping up a power supply voltage at a power supply voltage terminal using said second clock signals to generate first and second positive voltages; and a polarity inverting circuit, connected to said charge pump circuit and said second level shift circuit, for inverting said second positive voltage using said third clock signal to generate a negative voltage whose absolute value is the same as said second positive voltage, a high level of said second clock signals being not higher than said second positive voltage, a low level of said second clock signals being not lower than a voltage at a ground terminal, a high level of said third clock signal being not higher than said voltage at said ground voltage, a low level of said third clock signal being not lower than said negative voltage.

20. The step-up apparatus as set forth in claim 19, wherein said first level shift circuit comprises:

first and second cross-coupled load P-channel MOS transistors whose sources receive said second positive voltage; and first and second N-channel drive MOS transistors whose drains are connected to drains of said first and second cross-coupled load P-channel MOS transistors, respectively, gates of said first and second N-channel drive MOS transistors receiving said first clock signal and its inverted signal, respectively, the drains of said first and second N-channel drive MOS transistors generating said second clock signals.

21. The step-up apparatus as set forth in claim 19, wherein said second level shift circuit comprises:

a polarity inverting circuit for inverting said first clock signal;

first and second cross-coupled N-channel Load MOS transistors whose sources receive said negative voltage; and third and second P-channel drive MOS transistors whose sources receive said voltage at said ground terminal and whose drains are connected to drains of said first and second cross-coupled load N-channel MOS transistors, respectively, gates of said first and second drive P-channel MOS transistors receiving an output signal of said polarity inverting circuit and its inverted signal, respectively, the drain of one of said first and second P-channel drive MOS transistors generating said third clock signal.

22. The step-up apparatus as set forth in claim 21, wherein said polarity inverting circuit comprises a capacitor for receiving said first clock signal and a diode between said capacitor and said ground terminal.

23. The step-up apparatus as set forth in claim 19, wherein said charge pump circuit comprises:

a first circuit including a first step-up switching element, connected to said power supply voltage terminal, for generating said power supply voltage; and an i-th (i=2, 3, . . . , K) circuit including a charging capacitor, a first charging element connected between said ground terminal and said charging capacitor, a second charging element connected between said charging capacitor and said power supply voltage terminal, and a second step-up switching element connected to said charging capacitor and said second charging switching element for generating an "i" times said power supply voltage, said L-th (L=2, 3, . . . ) circuit generating said first positive voltage, said K-th (K>L) circuit generating said second positive voltage.

24. The step-up apparatus as set forth in claim 23, wherein each of said first and second step-up switching elements comprises a P-channel MOS transistor controlled by one of said second clock signals, said first charging element comprises an N-channel MOS transistor controlled by the one of said second clock signals, and said second charging element comprises a P-channel MOS transistor controlled by the other of said second clock signals.

25. A step-up apparatus comprising:

a first level shift circuit for receiving a clock first signal to generate two phase-opposite second clock signals;

a second level shift circuit for receiving said first clock signal to generate two phase-opposite third clock signals;

a charge pump circuit, connected to said first level shift circuit, for stepping up a power supply voltage at a power supply voltage terminal using said second clock signals to generate first and second positive voltages, said first positive voltage being smaller than said second positive voltage; and a polarity inverting circuit, connected to said charge pump circuit and said second level shift circuit, for inverting said first positive voltage using said third clock signals to generate a negative voltage whose absolute value is the same as said first positive voltage, a high level of said second clock signals being not higher than said first positive voltage, a low level of said second clock signals being not lower than a voltage at a ground terminal, a high level of said third clock signals being not higher than said power supply voltage, a low level of said third clock signals being not lower than said negative voltage.

26. The step-up apparatus as set forth in claim 25, wherein said first level shift circuit comprises:

first and second cross-coupled load P-channel MOS transistors whose sources receive said first positive voltage; and first and second N-channel drive MOS transistors whose drains are connected to drains of said first and second cross-coupled load P-channel MOS transistors, respectively, gates of said first and second N-channel drive MOS transistors receiving said first clock signal and its inverted signal, respectively, the drains of said first and second N-channel drive MOS transistors generating said second clock signals.

27. The step-up apparatus as set forth in claim 25, wherein said second level shift circuit comprises:

first and second cross-coupled N-channel Load MOS transistors whose sources receive said voltage as said ground terminal; and third and second P-channel drive MOS transistors whose sources receive said power supply voltage and whose drains are connected to drains of said first and second cross-coupled load N-channel MOS transistors, respectively, gates of said first and second drive P-channel MOS transistors receiving said first clock signal and its inverted signal, respectively, the drains of said first and second P-channel drive MOS transistors generating said third clock signals.

28. The step-up apparatus as set forth in claim 25, wherein said charge pump circuit comprises:

a first circuit including a first step-up switching element, connected to said power supply voltage terminal, for generating said power supply voltage; and an i-th (i=2, 3, . . . , L) circuit including a charging capacitor, a first charging element connected between said ground terminal and said charging capacitor, a second charging element connected between said charging capacitor and said power supply voltage terminal, and a second step-up switching element connected to said charging capacitor and said second charging element for generating an "i" times said power supply voltage, a K-th (K=2, 3, . . . , L−1) circuit generating said first positive voltage, and an L-th (L>K) circuit generating said second positive voltage.

29. The step-up apparatus as set forth in claim 28, wherein each of said first and second step-up switching elements comprises a P-channel MOS transistor controlled by one of said second clock signals, said first charging element comprising an N-channel MOS transistor controlled by the one of said second clock signals, said second charging element comprising a P-channel MOS transistor controlled by the other of said second clock signals.

30. The step-up apparatus as set forth in claim 25, wherein said charge pump circuit steps up said power supply voltage further using said third clock signals, said pump circuit comprising:

a first circuit including a first step-up switching element, connected to said power supply voltage terminal, for generating said power supply voltage; and an i-th (i=2, 3, . . . , L) circuit including a charging capacitor, a first charging element connected between said ground terminal and said charging capacitor, a second charging element connected between said charging capacitor and said power supply voltage terminal, and a second step-up switching element connected to said charging capacitor and said second charging element for generating an "i" times said power supply voltage, said first step-up switching element comprising a P-channel MOS transistor controlled by one of said third clock signals, said second charging element of said 2-nd circuit comprising a P-channel MOS transistor controlled by the other of said third clock signals, said first charging element of said i-th (i=2, 3, . . . , L) circuit comprising an N-channel MOS transistor controlled by the one of said second clock signals, said second charging element of said i-th (i=3, 4, . . . , L) circuit comprising a P-channel MOS transistor controlled by the other of said second clock signals, said second step-up switching element comprising a P-channel MOS transistor controlled by the other of said second clock signal, a K-th (K=2, 3, . . . , L−1) circuit generating said first positive voltage, and an L-th (L>K) circuit generating said second positive voltage.

31. A step-up apparatus comprising:

a first level shift circuit for receiving a clock first signal to generate two phase-opposite second clock signals;

a second level shift circuit for receiving said first clock signal to generate a third clock signal;

a charge pump circuit, connected to said first level shift circuit, for stepping up a power supply voltage at a power supply voltage terminal using said second clock signals to generate first and second positive voltages; and a polarity inverting circuit, connected to said charge pump circuit and said second level shift circuit, for inverting said first positive voltage using said third clock signal to generate a negative voltage whose absolute value is the same as said first positive voltage, a high level of said second clock signals being not higher than said first positive voltage, a low level of said second clock signals being not lower than a voltage at a ground terminal, a high level of said third clock signal being not higher than said voltage at said ground voltage, a low level of said third clock signal being not lower than said negative voltage.

32. The step-up apparatus as set forth in claim 31, wherein said first level shift circuit comprises:
    first and second cross-coupled load P-channel MOS transistors whose sources receive said first positive voltage; and
    first and second N-channel drive MOS transistors whose drains are connected to drains of said first and second cross-coupled load P-channel MOS transistors, respectively,
    gates of said first and second N-channel drive MOS transistors receiving said first clock signal and its inverted signal, respectively,
    the drains of said first and second N-channel drive MOS transistors generating said second clock signals.

33. The step-up apparatus as set forth in claim 31, wherein said second level shift circuit comprises:
    a polarity inverting circuit for inverting said first clock signal;
    first and second cross-coupled N-channel Load MOS transistors whose sources receive said negative voltage; and
    third and second P-channel drive MOS transistors whose sources receive said voltage at said ground terminal and whose drains are connected to drains of said first and second cross-coupled load N-channel MOS transistors, respectively,
    gates of said first and second drive P-channel MOS transistors receiving an output signal of said polarity inverting circuit and its inverted signal, respectively,
    the drain of one of said first and second P-channel drive MOS transistors generating said third clock signal.

34. The step-up apparatus as set forth in claim 33, wherein said polarity inverting circuit comprises a capacitor for receiving said first clock signal and a diode between said capacitor and said ground terminal.

35. The step-up apparatus as set forth in claim 31, wherein said charge pump circuit comprises:
    a first circuit including a first step-up switching element, connected to said power supply voltage terminal, for generating said power supply voltage; and
    an i-th (i=2, 3, . . . , L) circuit including a charging capacitor, a first charging element connected between said ground terminal and said charging capacitor, a second charging element connected between said charging capacitor and said power supply voltage terminal, and a second step-up switching element connected to said charging capacitor and said second charging element for generating an "i" times said power supply voltage,
    a K-th (K=2, 3, . . . ) circuit generating said first positive voltage, and
    an L-th (L>K) circuit generating said second positive voltage.

36. The step-up apparatus as set forth in claim 35, wherein each of said first and second step-up switching elements comprises a P-channel MOS transistor controlled by one of said second clock signals,
    said first charging element comprising an N-channel MOS transistor controlled by the one of said second clock signals,
    said second charging element comprising a P-channel MOS transistor controlled by the other of said second clock signals.

37. A step-up apparatus comprising:
    a first level shift circuit for receiving a first clock signal to generate a 2nd clock signal, a 3rd clock signal, . . . , a K-th clock signal (K=2, 3, . . . ) having a definite voltage swing;
    a second level shift circuit for receiving said first clock signal to generate two phase-opposite third clock signals;
    a charge pump circuit, connected to said first level shift circuit, for stepping up a power supply voltage at a power supply voltage terminal using said first, second, . . . , K-th clock signals to generate a positive voltage; and
    a polarity inverting circuit, connected to said charge pump circuit and said second level shift circuit, for inverting said positive voltage using said third clock signals to generate a negative voltage whose absolute value is the same as said positive voltage.

38. The step-up apparatus as set forth in claim 37, wherein said charge pump circuit comprises:
    a first circuit including a first step-up switching element, connected to said power supply voltage terminal, for generating said power supply voltage in accordance with said first clock signal;
    an i-th (i=2, 3, . . . , K) circuit including a charging capacitor, a first charging element connected between said ground terminal and said charging capacitor, a second charging element connected between said charging capacitor and said power supply voltage terminal, and a second step-up switching element connected to said charging capacitor and said second charging element for generating an "i" times said power supply voltage.

39. The step-up apparatus as set forth in claim 38, wherein said first step-up switching element comprises a P-channel MOS transistor controlled by said first clock signal,
    said first charging element comprising an N-channel MOS transistor controlled by said first clock signal,
    said second charging element comprising an N-channel MOS transistor controlled by said second clock signal,
    said second step-up switching element of said i-th (i=2, 3, . . . , K) circuit comprising a P-channel MOS transistor controlled by said i-th clock signal.

40. The step-up apparatus as set forth in claim 38, wherein said first level shift circuit comprises an i-th (i=2, 3, . . . , K) level shift unit is powered by $(i-2)\cdot V_{DD}$, $(i-1)\cdot V_{DD}$ and $i\cdot V_{DD}$ where $V_{DD}$ is a power supply voltage.

41. The step-up apparatus as set forth in claim 40, wherein said i-th level shift unit comprises:
    cross-coupled first and second load N-channel MOS transistors whose sources receive $(i-2)\cdot V_{DD}$;
    first and second drive P-channel MOS transistors whose sources receive $(i-1)\cdot V_{DD}$ and whose drains are connected to drains of said first and second load N-channel MOS transistors, respectively;
    cross-coupled first and second load P-channel MOS transistors whose sources receive $i\cdot V_{DD}$; and
    first and second drive N-channel MOS transistors whose sources receive $(i-2)\cdot V_{DD}$, whose drains are connected to drains of said first and second load P-channel MOS transistors, respectively, and whose gates are connected to gates of said first and second load N-channel MOS transistors, respectively,
    gates of said first and drive P-channel MOS transistors receiving said (i-1)-th clock signal and its inverted signal, the drain of said second drive N-channel MOS transistor generating said i-th clock signal via an inverter.

42. A step-up apparatus comprising:
a level shift circuit for receiving a first clock signal to generate a 2nd clock signal, a 3rd clock signal, . . . , a K-th clock signal (K=2, 3. . . . ) having a definite voltage swing; and
a charge pump circuit, connected to a first level shift circuit, for stepping up a power supply voltage at a power supply voltage terminal using said first, second K-th clock signals to generate a positive voltage, said charge pump comprising:
a first circuit including a first step-up switching element, connected to said power supply voltage terminal, for generating said power supply voltage in accordance with said first clock signal:
an i-th (i=2, 3. . . , K) circuit including a charging capacitor, a first charging element connected between a ground terminal and said charging capacitor, a second charging element connected between said charging capacitor and said power supply voltage terminal, and a second step-up switching element connected to said charging capacitor and said second charging element for generating an "i" times said power supply voltage, wherein
said second step-up switching element of said i-th (i=2, 3, . . . K) circuit comprises a P-channel MOS transistor controlled by an i-th clock signal,
said first step-up switching element comprises a P-channel MOS transistor controlled by said first clock signal,
said first charging element comprising an N-channel MOS transistor controlled by said first clock signal, and
said second charging element comprising an N-channel MOS transistor controlled by said second clock signal.

43. A step-up apparatus comprising:
a level shift circuit for receiving a first clock signal to generate a 2nd clock signal, a 3rd clock signal, . . . , a K-th clock signal (K=2, 3, . . . ) having a definite voltage swing; and
a charge pump circuit, connected to a first level shift circuit, for stepping up a power supply voltage at a power supply voltage terminal using said first, second, . . . , K-th clock signals to generate a positive voltage, said charge pump comprising:
a first circuit including a first step-up switching element, connected to said power supply voltage terminal, for generating said power supply voltage in accordance with said first clock signal;
an i-th (i=2, 3, . . . , K) circuit including a charging capacitor, a first charging element connected between a ground terminal and said charging capacitor, a second charging element connected between said charging capacitor and said power supply voltage terminal, and a second step-up switching element connected to said charging capacitor and said second charging element for generating an "i" times said power supply voltage, wherein said second step-up switching element of said i-th (i=2, 3, . . . , K) circuit comprises a P-channel MOS transistor controlled by an i-th clock signal,
wherein said level shift circuit comprises an i-th (i=2, 3, . . . , K) level shift unit is powered by $(i-2) \cdot V_{DD}$, $(i-1) \cdot V_{DD}$ and $i \cdot V_{DD}$ where $V_{DD}$ is a power supply voltage.

44. A step-up apparatus comprising:
a level shift circuit for receiving a first clock signal to generate a 2nd clock signal, a 3rd clock signal, . . . , a K-th clock signal (K=2, 3, . . . ) having a definite voltage swing; and
a charge pump circuit, connected to a first level shift circuit, for stepping up a power supply voltage at a power supply voltage terminal using said first, second, . . . , K-th clock signals to generate a positive voltage, said charge pump comprising:
a first circuit including a first step-up switching element, connected to said power supply voltage terminal, for generating said power supply voltage in accordance with said first clock signal;
an i-th (i=2, 3, . . . , K) circuit including a charging capacitor, a first charging element connected between a ground terminal and said charging capacitor, a second charging element connected between said charging capacitor and said power supply voltage terminal, and a second step-up switching element connected to said charging capacitor and said second charging element for generating an "i" times said power supply voltage, wherein
said second step-up switching element of said i-th (i=2, 3, . . . , K) circuit comprises a P-channel MOS transistor controlled by an i-th clock signal,
wherein said i-th level shift unit comprises:
cross-coupled first and second load N-channel MOS transistors whose sources receive $(i-2) \cdot V_{DD}$;
first and second drive P-channel MOS transistors whose sources receive $(i-1) \cdot V_{DD}$ and whose drains are connected to drains of said first and second load N-channel MOS transistors, respectively;
cross-coupled first and second load P-channel MOS transistors whose sources receive $i \cdot V_{DD}$; and
first and second drive N-channel MOS transistors whose sources receive $(i-2) \cdot V_{DD}$, whose drains are connected to drains of said first and second load P-channel MOS transistors, respectively, and whose gates are connected to gates of said first and second load N-channel MOS transistors, respectively,
gates of said first and drive P-channel MOS transistors receiving an (i−1)-th clock signal and its inverted signal,
the drain of said second drive N-channel MOS transistor generating said i-th clock signal via an inverter.

* * * * *

UNITED STATES PATENT AND TRADEMARK OFFICE
CERTIFICATE OF CORRECTION

| | | |
|---|---|---|
| PATENT NO. | : 7,005,912 B2 | Page 1 of 1 |
| APPLICATION NO. | : 10/684441 | |
| DATED | : February 28, 2006 | |
| INVENTOR(S) | : Yoshihiro Nonaka | |

It is certified that error appears in the above-identified patent and that said Letters Patent is hereby corrected as shown below:

Column 4, line 58, delete "32", insert --33--;
Column 4, line 59, delete both occurrences of "$N_2$", insert --$N_3$--;
Column 4, line 60, delete "32", insert --33--;
Column 4, line 62, delete "$N_2$", insert --$N_k$--;
Column 4, line 63, delete "$N_2$", insert --$N_k$--;
Column 5, line 27, delete "32", insert --42--;
Column 5, line 29, delete "$N_2$", insert --$N_k$--;
Column 5, line 30, delete "$N_2$", insert --$N_k$--;
Column 11, line 47, delete "third", insert --first--;
Column 13, line 21, delete "third", insert --first--;
Column 14, line 34, delete "as", insert --at--;
Column 14, line 36, delete "third", insert --first--;
Column 16, line 23, delete "third", insert --first--;
Column 15, line 52, after "voltages", insert --said first positive voltage being smaller than said second positive voltage--;
Column 17, line 42, delete "third", insert --first--;
Column 19, line 25, delete "third", insert --first--;
Column 20, line 65, after "and", insert --second--;
Column 22, line 50, after "and", insert --second--;
Fig. 11, drawing sheet 10 of 30, delete "φ23", insert -- φ2--, delete "5A", insert -- -7A--;
Fig. 21, drawing sheet 20 of 30, delete "3R", insert --3A--.

Signed and Sealed this

Thirteenth Day of November, 2007

JON W. DUDAS
*Director of the United States Patent and Trademark Office*